(12) United States Patent
Van Doren et al.

(10) Patent No.: US 6,898,676 B2
(45) Date of Patent: May 24, 2005

(54) COMPUTER SYSTEM SUPPORTING BOTH DIRTY-SHARED AND NON-DIRTY-SHARED DATA PROCESSING ENTITIES

(75) Inventors: Stephen R. Van Doren, Northborough, MA (US); Gregory E. Tierney, Chelmsford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 181 days.

(21) Appl. No.: 10/263,741

(22) Filed: Oct. 3, 2002

(65) Prior Publication Data

US 2004/0068624 A1 Apr. 8, 2004

(51) Int. Cl.$^7$ ................................. G06F 12/00
(52) U.S. Cl. ................ 711/147; 711/130; 711/141; 711/142; 711/143; 711/146
(58) Field of Search ................ 711/130, 141, 711/142, 143, 146, 147

(56) References Cited

U.S. PATENT DOCUMENTS

| | | | |
|---|---|---|---|
| 4,847,804 A | 7/1989 | Shaffer et al. | |
| 5,222,224 A | 6/1993 | Flynn et al. | |
| 5,233,616 A | 8/1993 | Callander | |
| 5,297,269 A | 3/1994 | Donaldson et al. | |
| 5,303,362 A | 4/1994 | Butts, Jr. et al. | |
| 5,313,609 A | 5/1994 | Baylor et al. | |
| 5,490,261 A | 2/1996 | Bean et al. | |
| 5,530,933 A | 6/1996 | Frink et al. | |
| 5,553,266 A | * 9/1996 | Metzger et al. | 711/144 |
| 5,555,382 A | * 9/1996 | Thaller et al. | 710/113 |

FOREIGN PATENT DOCUMENTS

EP   0 817 074 A1   7/1998

OTHER PUBLICATIONS

Scales, D. and Gharachorloo, K., Design and Performance of the Shasta Distributed Shared Memory Protocol, XP–000755264, Jul. 7, 1997, pp. 245–252.

Scales, D., Gharachorloo, K. and Thekkath, C., Shasta: A Low Overhead, Software–Only Approach for Supporting Fine–Grain Shared Memory, XP–002173083, Jan. 10, 1996, pp. 174–185.

Scales, D. and Gharachorloo, K., Towards Transparent and Efficient Software Distributed Shared Memory, XP–000771029, Dec. 1997, pp. 157–169.

Scales, D., Gharachorlloo, K. and Aggarwal, A., Fine–Grain Software Distributed Shared Memory on SMP Clusters, WRL Research Report 97/3, Feb. 1997, pp. i and 1–28.

Gharachorloo, K., Lenoski, D., Laudon, J., Gibbons, P., Gupta, A. and Hennessey, J., Memory Consistency and Event Ordering in Scalable Shared–Memory Multiprocessors, (c) 1990 IEEE, pp. 15–26.

(Continued)

Primary Examiner—Mano Padmanabhan
Assistant Examiner—Mehdi Namazi

(57) ABSTRACT

A computer system supports a first set of processors configured to operate in a dirty-shared mode and a second set of processors configured to operate in a non dirty-shared mode. The computer system may include a portion of shared memory that stores data in terms of memory blocks. Upon receiving a snoop read requesting shared access to a memory block held in a dirty state, a dirty-shared processor sends a copy of the memory block to the originator of the snoop read and retains a valid a copy of the block in its cache. Non dirty-shared processors additionally write the block back to main memory in response to snoop reads and may also send a copy to the originator. Until the write back is completed at main memory or another processor is granted write access to the block, the dirty-shared and non dirty-shared processors preferably continue to satisfy sub-sequent snoop reads targeting the memory block.

14 Claims, 13 Drawing Sheets

OTHER PUBLICATIONS

Jouppi, N., Improving Direct–Mapped Cache Performance by the Addition of a Small Fully–Associative Cache and Prefetch Buffers, (c) 1990 IEEE, pp. 364–373.

Agarwal, A., Simoni, R., Hennesy, J. and Horowitz, M., An Evaluation of Directory Schemes for Cache Coherence, (c) 1988 IEEE, pp. 353–362.

Papapanaroos, M. and Patel, J., A Low–Overhead Coherence Solution for Multiprocessors with Private Cache Memories, (c) 1984 IEEE, pp. 284–290.

UltraSPARC Ultra Port Architecture (UPA): The New–Media System Architecture, http://www.sun.com/processors/whitepapers/wp95–023.html, Copyright 1994–2002 Sun Microsystems, pp. 1–4.

Porting OpenVMS Applications to Intel Itanium Architecture, Compaq Computer Corporation, Apr. 2002, pp. 1–17.

Adve, S., Hill, M., Miller, B. and Nester, R., Detecting Data Races on Weak Memory Systems, (c) 1991 ACM, pp. 234–243.

Gharachorloo, K., Sharma, M., Steely, S. and Van Doren, S., Architecture and Design of AlphaServer GS320, Nov. 2000, pp. 1–12.

IEEE Standard for Scalable Coherent Interface (SCI), (c) 1993 IEEE, pp. Table of Contents, 30–34 and 141–188.

* cited by examiner

| | DIRECTORY 100 | | | |
|---|---|---|---|---|
| ADDRESS 103 | OWNER 104 | SHARERS 106 | | |
| | | FIRST SHARER 106a | SECOND SHARER 106b | THIRD SHARER 106c |
| 102a — 308 | P3 | - | - | - |
| 102b — 157 | MEMORY | P6 | P4 | P3 |
| 102c — 221 | MEMORY | P7 | P1 | - |
| 102d — 414 | P1 (MEMORY) | P2 | - | - |

FIG. 1
(PRIOR ART)

| | DIRECTORY | | | | | | |
|---|---|---|---|---|---|---|---|
| MAIN DIRECTORY REGION 802 | | | | | WRITE-BACK DIRECTORY REGION 804 | | |
| OWNER/ SHARER 814 | SHARER LIST 816 | | UNUSED 818 | ECC 820 | WRITER 822 | UNUSED 824 | ECC 826 |
| | SHARER 0 816a | SHARER 1 816b | | | | | |
| | | (SHARER VECTOR) 816c | | | | | |
| 806a — MEMORY | 0 | 0 | 0 | - | MEMORY | 0 | - |
| 806b — MEMORY | P0 | 0 | 0 | - | MEMORY | 0 | - |
| 806c — P0 | 0 | 0 | 0 | - | MEMORY | 0 | - |
| 806d — P0 | P1 | 0 | 0 | - | MEMORY | 0 | - |
| 806e — P2 | 0 | 0 | 0 | - | P2 | 0 | - |
| 806f — P2 | P3 | 0 | 0 | - | P2 | 0 | - |
| 806g — P2 | 0 | 0 | 0 | - | 0 | 0 | - |
| 806h — P2 | P12 | 0 | 0 | - | MEMORY | 0 | - |
| 807 — P9 | P6 | 0100011100000000 | 0 | - | MEMORY | 0 | - |
| 808 — P6 | 0100011100000000 | | 0 | - | MEMORY | 0 | - |
| 809 — P10 | 0 | 0 | 0 | - | P12 | 0 | - |
| 810 — P8 | 0000010000000010 | | 0 | - | MEMORY | 0 | - |

COMPUTER SYSTEM SUPPORTING BOTH DIRTY-SHARED AND NON-DIRTY-SHARED DATA PROCESSING ENTITIES

CROSS-REFERENCE TO RELATED APPLICATION

U.S. patent application Ser. No. 10/263,739 titled DIRECTORY STRUCTURE PERMITTING EFFICIENT WRITEBACKS IN A SHARED MEMORY COMPUTER SYSTEM, filed Oct. 3, 2002;

U.S. patent application Ser. No. 10/263,836 titled CHANNEL-BASED LATE RACE RESOLUTION MECHANISM FOR A COMPUTER SYSTEM, filed Oct. 3, 2002; and U.S. patent application Ser. No. 10/263,743 titled RETRY-BASED LATE RACE RESOLUTION MECHANISM FOR A COMPUTER SYSTEM, filed Oct. 3, 2002.

BACKGROUND OF THE INVENTION

1. Field of the Invention

The present invention relates to computer systems and, more specifically, to shared memory computer systems.

2. Background Information

A computer system typically comprises one or more processors linked to a main memory by a bus or other interconnect. In most computer systems, main memory organizes the instructions and data being stored into units typically referred to as "blocks" each of which is separately addressable and may be of a fixed size. Instructions and data are typically moved about the computer system in terms of one or more blocks.

Ordinarily, a processor will retrieve data, e.g., one or more blocks, from main memory, perform some operation on it, and eventually return the results back to main memory. Retrieving data from main memory and providing it to a processor can take significant time especially in terms of the high operating speeds of today's processors. To reduce such latencies as well as to reduce the number of times a processor must access main memory, modern processors and/or processor chipsets include one or more cache memories or caches. A cache is a small, fast memory module that is placed in close proximity to the processor. Many caches are static random access memories (SRAMs), which are faster, but more expensive, than dynamic random access memories (DRAMs), which are often used for main memory. The cache is used to store information, e.g., data or instructions, which the processor is currently using or is likely to use in the near future. There are two basic types of caches: "write-through" caches and "write-back" caches.

With a write-through cache, whenever a processor modifies or updates a piece of data in the processor's cache, main memory's copy of that data is automatically updated. This is accomplished by having the processor write the data back to memory whenever the data is modified or updated. A write-back cache, in contrast, does not automatically send modified or updated data to main memory. Instead, the updated data remains in the cache until some more convenient time, e.g., when the processor is idle, at which point the modified data is written back to memory. The utilization of write-back caches typically improves system performance. In some systems, a write-back or victim buffer is provided in addition to the cache. "Victim data" refers to modified data that is being removed from the processor's cache in order to make room for new data received at the processor. Typically, the data selected for removal from the cache is data the processor is no longer using. The victim buffer stores this modified data which is waiting to be written back to main memory. Modified data in the victim buffer is eventually "victimized", i.e., written back to main memory, at some convenient time.

Symmetrical Multiprocessor (SMP) Systems

Multiprocessor computing systems, such as symmetrical multiprocessor (SMP) systems, provide a computer environment in which software applications may run on a plurality of processors using a single address space or shared memory abstraction. In a shared memory system, each processor can access any data item without a programmer having to worry about where the data is or how to obtain its value. This frees the programmer to focus on program development rather than on managing partitioned data sets and communicating values.

Cache Coherency

Because more than one processor of the SMP system may request a copy of the same memory block from main memory, cache coherency protocols have been developed to ensure that no processor relies on a memory block that has become stale, typically due to a modification or update performed to the block by some other processor. Many cache coherency protocols associate a state with each cache line. A given memory block, for example, may be in a shared state in which copies of the block may be present in the caches associated with multiple processors. When a memory block is in the shared state, a processor may read from, but not write to, the respective block. To support write operations, a memory block may be in an exclusive state. In this case, the block is owned by a single processor which may write to the cache line. When the processor updates or modifies the block, its copy becomes the most up-to-date version, while corresponding copies of the block at main memory and/or other processor caches become stale.

There are two classes of cache coherency protocols: snooping and directory based. With snooping, the caches monitor or snooped all transactions traversing the shared memory bus, looking for transactions that reference a memory block stored at the cache. If such a transaction is detected, the cache updates the status information for its copy of the memory block based on the snooped transaction. In this way, every cache that has a copy of a given memory block also has a copy of the status information of that block. With a directory based protocol, the state of each block is kept in a single, centralized location in the system, called a directory. Status information is not maintained in the individual caches.

FIG. 1 is a highly schematic illustration of a prior art directory 100. Directory 100 has a plurality of entries 102a–d each of which corresponds to a respective memory block. The directory 100 is organized, moreover, such that each entry 102a–d has a plurality of fields or cells for storing state and/or status information for the respective block. In particular, the directory 100 has an address column 103 that stores the address of the memory block, an owner column 104 that stores the identity of the entity, e.g., a processor or main memory itself, that is considered to be the owner of the memory block, and a sharer column 106 that stores the identity of those processors or other system entities that have a shared copy of the block.

The sharer column 106 may have a plurality of subcolumns 106a–c, each of which may contain the identity of a particular processor that has a shared copy of the respective memory block. If a request for shared access to a memory block is received from a first processor, P1, main memory examines the directory entry, e.g., entry 102c, for the block to determine its owner. As memory is itself the owner of the block, memory sends its copy of the block to P1 and enters P1's identifier (ID) into one of the sharer fields, e.g. field 106b, of the respective directory entry, e.g., entry 102c, thereby noting that P1 has a shared copy of the block. Since P1 only requested shared access to the memory block, the contents of the entry's owner field 104 are not modified.

Most processors also maintain several flags for each memory block stored in the processor's cache, such as valid, dirty and shared flags. When P1 receives and stores the memory block in its cache, it also asserts the valid flag associated with the cache line at which the block is stored. Memory blocks stored at cache lines whose valid flags are asserted can be utilized by the processor in its thread or application.

If P1 issues a request for exclusive or write access to some other memory block, e.g., the block corresponding to entry 102d, main memory again examines the contents of entry 102d. Suppose that, at the time the request is received, the owner field reflected that memory was the owner of the memory block as shown in parentheses. In this case, memory sends the block to P1, and replaces the contents of the owner field 104 with P1's ID to reflect that P1, rather than memory, is now the owner of the memory block. P1 may then modify or update the memory block. Upon storing the block in its cache, P1 asserts both the valid flag to indicate that the cache line contains valid data and the dirty flag to indicate that P1 can modify the contents of the cache line, e.g., update the memory block.

If a request from a second processor, P2, is subsequently received for a shared copy of this memory block, main memory examines entry 102d of the directory 100 and determines that P1 is the owner of the memory block. Because its copy of the block, i.e., the copy stored at main memory, may be stale, memory does not forward its copy to P2. Instead, memory may be configured to forward the request to P1 and add P2's ID to one of the sharer fields, e.g., field 106a. In response to the forwarded request, P1 may then satisfy P2's request by sending it a copy of the modified memory block from P1's cache. P1 may also assert the cache line's shared flag to reflect that the block is being shared with another processor. Processors, such as P1, that are configured or designed to share memory blocks that are in the dirty state are known as "dirty-shared" processors.

Other processors, known as "non dirty-shared" processors are specifically configured or designed to prevent memory blocks that are in the dirty state from being shared. If a non dirty-shared processor receives a request for a read access copy of a dirty memory block (a block to which the processor has exclusive access), it sends a copy of the block to the requester from its cache, but also relinquishes its ownership of the memory block and returns the block to main memory. Depending on its design, the non dirty-shared processor may or may not retain a valid copy of the memory block in its cache. If a copy is retained, it is treated as being a read only copy. Because non dirty-shared processors do not share copies of memory blocks in the dirty state, only two flags: valid and dirty, are typically maintained for each cache line.

It has been recognized that a computer system's cache coherency protocol is a key factor in the system's ultimate performance. Poorly designed cache coherency protocols can result in latencies, bottlenecks, other inefficiencies and/or higher complexity, each of which may reduce performance and/or increase cost. Bottlenecks, for example, often arise in high occupancy controllers, such as directory controllers. "Occupancy" is a term of art and refers to the amount of time a controller is unavailable while it services a current request.

In some cache coherency protocols, when a directory controller receives a request corresponding to a memory block, it thereafter becomes unavailable to service other requests for that memory block until certain acknowledgements to the earlier request are received back at the directory controller. The stalling of later requests or references until the directory controller is once again available may degrade system performance. Thus, efforts have been made to design low occupancy cache coherency protocols, which allow multiple requests to the same memory block to be executing substantially simultaneously within the computer system.

Furthermore, because the selection of a dirty-shared or non dirty-shared processor architecture has substantial implications for the cache coherency protocol, multiprocessor computer systems comprise only one type of processor. That is, a multiprocessor computer has either all dirty-shared processors or all non dirty-shared processors.

SUMMARY OF THE INVENTION

Briefly, the present invention relates to a computer system that includes a combination of both dirty-shared and non dirty-shared data processing entities, such as processors. In the illustrative embodiment, the computer system is a shared memory, multiprocessor computer system, such as a symmetrical multiprocessor (SMP) computer system, utilizing a low occupancy cache coherency protocol. The SMP system may comprise one or more nodes, each having a plurality of processors and a portion of shared memory, that are coupled together by an interconnect fabric. The shared memory is configured to store data in terms of memory blocks, and each processor preferably has a cache for storing copies of memory blocks being used by the processor. Associated with each cache entry are a plurality of flags such as a valid flag and a dirty flag. A shared flag may also be provided. The shared memory further includes one or more directories for storing status information for the memory blocks. The directory has a plurality of entries each of which is assigned to a respective memory block, and is organized into a main directory region and a write-back directory region. Each entry includes an owner/sharer field and a sharer list within the main directory region, and a writer field within the write-back region. The owner/sharer field indicates which entity, e.g., processor, is the owner of the block, while the sharer list indicates which entities, e.g., other processors, have a read-only copy of the memory block in their caches. The writer field identifies the last owner to have written the memory block back to the memory subsystem.

In operation, a first data processing entity issues a request for write access to a specified memory block. The home memory subsystem updates the directory entry for the specified memory block by entering an identifier (ID) associated with the first requesting data processing entity in the owner field. When the first data processing entity receives the memory block it fills its cache and asserts both the valid and dirty flags. If a second data processing entity issues a request for read access to the same memory block, the home memory subsystem forwards the request to the first data processing entity for servicing. If the first data processing entity is configured to operate in a dirty-shared mode, it sends a copy of the memory block from its cache to the second data processing entity and asserts the shared flag.

The first data processing entity continues to treat the memory block as valid, but does not perform any further modifications or updates to the block. The first data processing entity can also service subsequent requests for read or write access to the memory block initiated by other data processing entities.

If the first data processing entity is configured to operate in a non dirty-shared mode, it similarly sends a copy of the memory block from its cache to the second data processing entity. In this case, however, the first data processing entity also writes the memory block back to memory. The first data processing entity may or may not retain a valid, read access copy of the memory block in its cache. Assuming the first data processing entity retains a valid copy of the memory block, it satisfies subsequent requests for read or write access to the memory block initiated by other data processing entities until the write back completes or its copy of the block is invalidated. If the first data processing entity does not retain a valid copy of the memory block upon issuing the write back, subsequent requests will result in a cache miss. In this case, the system invokes a late race mechanism.

BRIEF DESCRIPTION OF THE DRAWINGS

The invention description below refers to the accompanying drawings, of which:

FIG. 1, previously discussed, is a highly schematic diagram of a conventional directory;

FIG. 8 is a highly schematic block diagram of the directory of the present invention.

DETAILED DESCRIPTION OF AN ILLUSTRATIVE EMBODIMENT

Figure 2:
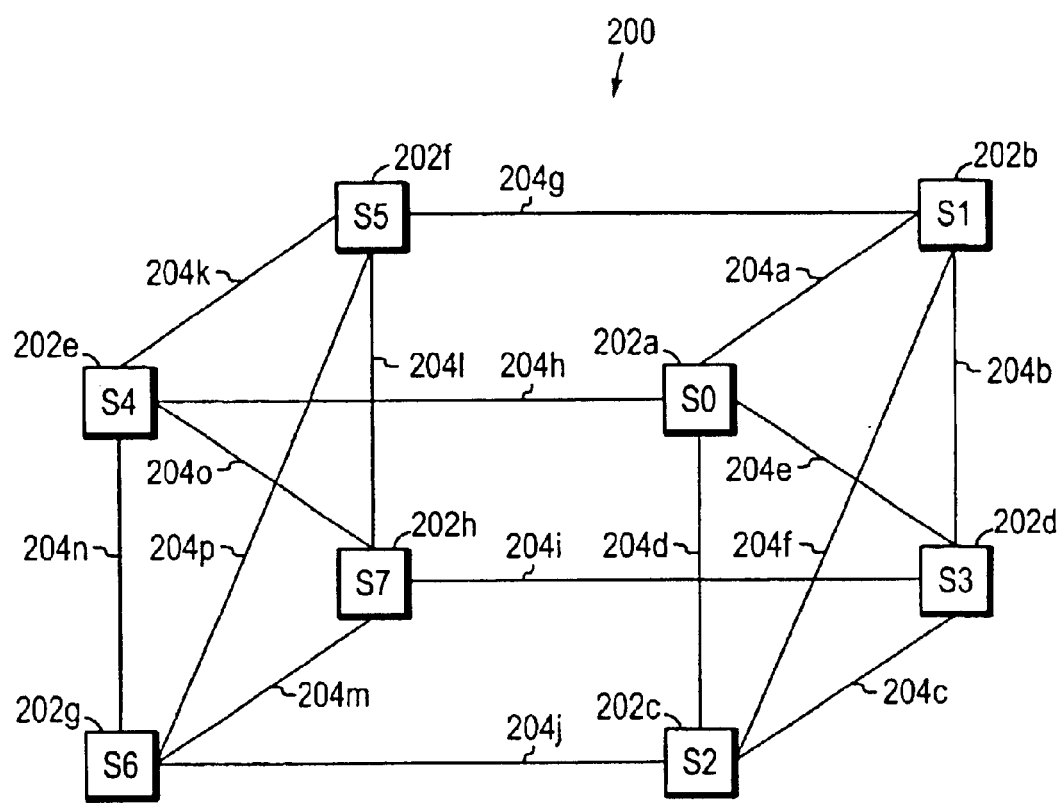
FIG. 2 is a highly schematic functional block diagram of a multi-processor node.

FIG. 2 is a highly schematic illustration of a preferred multiprocessor node 200 for use with the present invention. The node 200 comprises a plurality of, e.g., eight, sockets, S0–S7, which are designated by reference numerals 202a–h. The eight sockets 202a–h are logically located in three-dimensional space at the corners of a cube, and are interconnected by a plurality of inter-processor links 204a–p. Thus, each socket can communicate with any other socket of the node 200. In the illustrative embodiment, sockets forming two opposing sides of the node 200 are fully interconnected, while the two sides are connected only along the edges of the cube. That is, sockets S0–S3, which form one side of the cube, and S4–S7, which form the opposing side of the cube, are fully interconnected with each other, while the two opposing sides are connected by four inter-socket links 204g–j. As described herein, each socket includes one or more processors and has or is coupled to two main memory subsystems.

Figure 3:
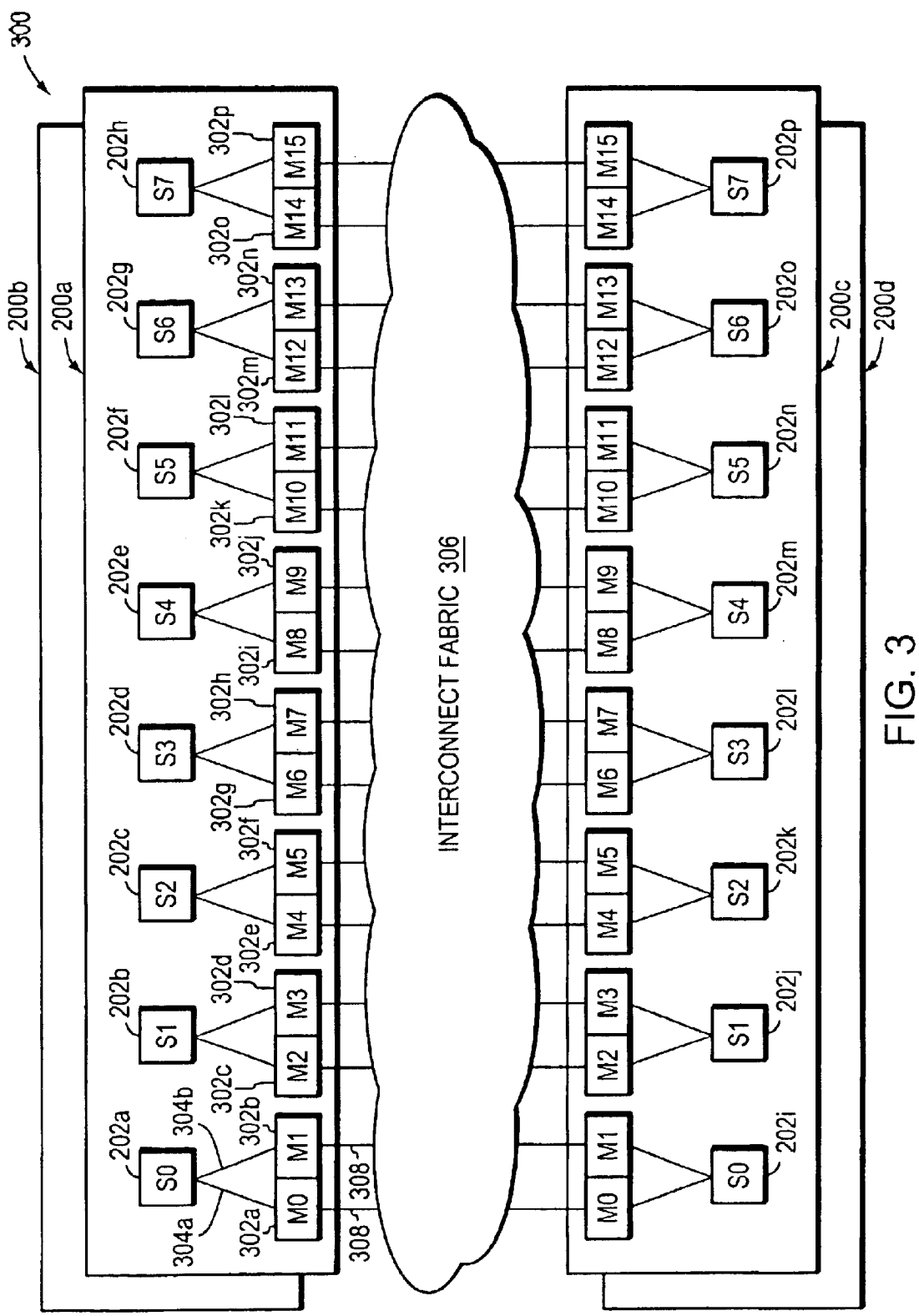
FIG. 3 is a highly schematic functional block diagram of a symmetrical multiprocessor (SMP) computer system formed from a plurality of multi-processor nodes.

FIG. 3 is a highly schematic illustration of a symmetrical multiprocessing (SMP) computer system 300 formed from a plurality of nodes. In particular system 300 comprises four nodes 200a–d, each of which is similar to node 200 (FIG. 2), although the inter-processor links have been omitted for clarity. As described above, each node, such as nodes 200a and 200c, has eight sockets, such as sockets 202a–h and 202i–p, respectively. Each node also includes a plurality of main memory subsystems. Preferably, each socket is coupled to a pair of memory subsystems, thereby providing sixteen memory subsystems at each node. At node 200a, the sixteen memory subsystems M0–M15 are designated by reference numerals 302a–p, and socket 202a is coupled to its pair of memory subsystems 302a and 302b by corresponding processor/memory links 304a and 304b.

The four nodes 200a–d, moreover, are fully interconnected with each other through an interconnect fabric 306. Specifically each memory subsystem, such as subsystems systems 302a and 302b, are connected to the interconnect fabric 306 by fabric links 308. In the preferred embodiment, each memory subsystem at a given node is coupled to its counterpart memory subsystem at the other three nodes. That is, memory subsystem M0 at node 200a is coupled by four fabric links to the M0 memory subsystem at the three other nodes 202b–d, memory subsystem M1 at node 200a is coupled by four fabric links to the M1 memory subsystem at the other three nodes 202b–d, and so on.

Figure 4:
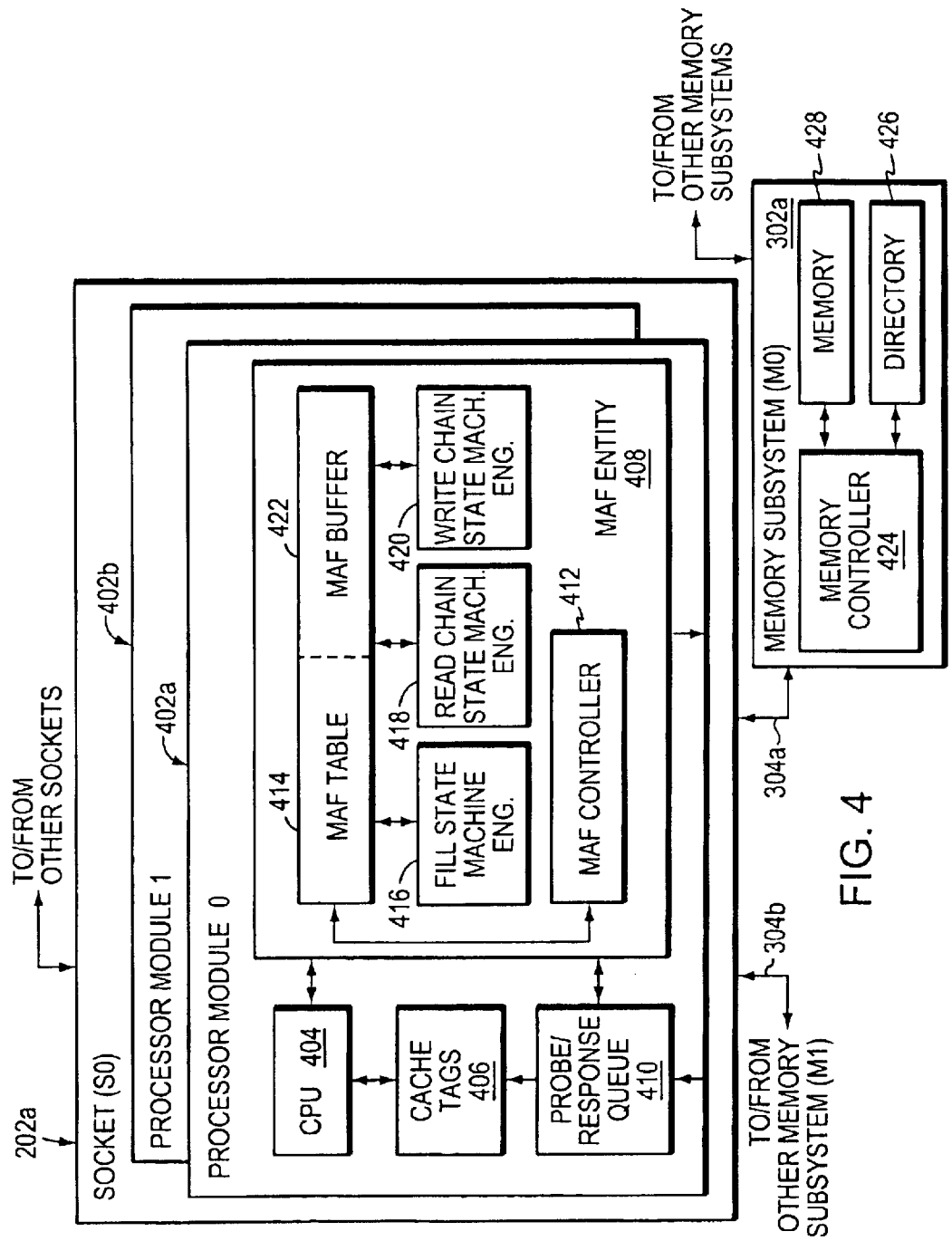
FIG. 4 is a highly schematic block diagram of a processor socket and memory subsystem of the SMP computer system of FIG. 3.

FIG. 4 is a highly schematic illustration of socket (S0) 202a, and one of its associated memory subsystems (M0) 302a. Socket 202a includes two processor modules 402a and 402b. Each processor module, such as module 402a, has a processor or central processing unit (CPU) 404, a cache tags storage device 406, a miss address file (MAF) entity 408 and a probe/response queue 410. The CPU 404 includes one or more processor caches (not shown) at one or more levels that are in close proximity to the CPU for storing data that the CPU 404 is currently using or is likely to use in the near future. The caches are organized into cache lines, and each cache line can store a memory block. Information regarding the status of the memory blocks stored in the processor cache(s), such as the address and validity of the block, is maintained in the cache tags storage device 406, as described below. Device 406 may also store information regarding memory blocks stored at processor registers.

The MAF entity 408, which keeps track of outstanding commands, such as memory reference requests, issued to the system for memory blocks not presently in the cache, has a MAF controller 412, a MAF table 414 and one or more state machine engines. In the illustrative embodiment, the MAF entity 408 has a fill state machine engine 416, a read chain state machine engine 418 and a write chain state machine engine 420. A section or area of the MAF table 414, moreover, may be organized as a buffer, such as MAF buffer 422. The MAF buffer 422 may be used to temporarily store memory blocks received in response to the memory reference requests issued by the CPU 404, and awaiting loading into a processor cache entry or processor register.

Processor module 402b similarly includes a CPU, a cache tags storage device, a MAF entity and a probe/response queue. Socket (S0) 202a is coupled to the other sockets (S1–S7) of node 200a by inter-socket links and to memory subsystems (M0) 302a and (M1) 302b by processor/memory links 304a and 304b, respectively.

It should be understood that each processor module 402 may include other components, such as a write back or victim buffer, a register file, a translation look-aside buffer (TLB), load/store (L/S) queues, etc.

CPU 404 may be and/or include any one of the processors from the Itanium architecture from Intel Corp. of Santa Clara, Calif., such as the Itanium® 1 or Itanium® 2 processors. Nonetheless, those skilled in the art will understand that other processors, such as the Hammer series of 64-bit processors from Advanced Micro Devices, Inc. (AMD) of Sunnyvale, Calif., may also be used.

The memory subsystem (M0) 302*a* has a memory controller 424, a directory 426 and one or more memory modules or banks, such as memory device or unit 428. The memory subsystems of nodes 200*a–d* combine to form the main memory of the SMP system 300 some or all of which may be shared among the processors. Each socket 202, moreover, includes a portion of main memory by virtue of its respective memory subsystems 302. Data stored at the memories 428 of each subsystem 302, moreover, is organized into separately addressable memory blocks that, as mentioned above, are equivalent in size to the amount of data stored in a processor cache line. The memory blocks or cache lines are of uniform, fixed size, and represent the smallest unit of data that can be moved around the SMP system 300. In the preferred embodiment, each cache line contains 128-bytes of data, although other fixed sizes, such as 64-bytes, could be utilized. Each memory address, moreover, maps to and thus identifies one and only one memory block. And, a plurality of address bits, such as the upper three address bits, are preferably employed to identify the "home" memory subsystem of the respective memory block. That is, each memory block, which is separately addressable by the SMP system 300, has a pre-determined home memory subsystem that does not change. Each directory, moreover, maintains status information for the memory blocks for which its memory subsystem is the home memory. In other words, rather than having a single, centralized directory, the "directory" for the SMP system 300 is distributed across all of the memory subsystems.

Memory unit 428 may be and/or may include one or more conventional or commercially available memory structures, such as dynamic random access memory (DRAM), synchronous DRAM (SDRAM), double data rate SDRAM (DDR-SDRAM) or Rambus DRAM (RDRAM) memory devices, among others.

It should also be understood that each socket 202 may further include one or more input/output (I/O) subsystems (not shown), such as an I/O bridge, that connects one or more I/O devices or peripherals to the SMP system 300. The I/O subsystems, moreover, may have their own private caches for buffering data, and the I/O devices may be granted access to some or all of the SMP system's main memory through the I/O subsystems. The processors and I/O subsystems may be referred to as data processing entities as they are configured to issue requests for memory blocks.

Figure 5:
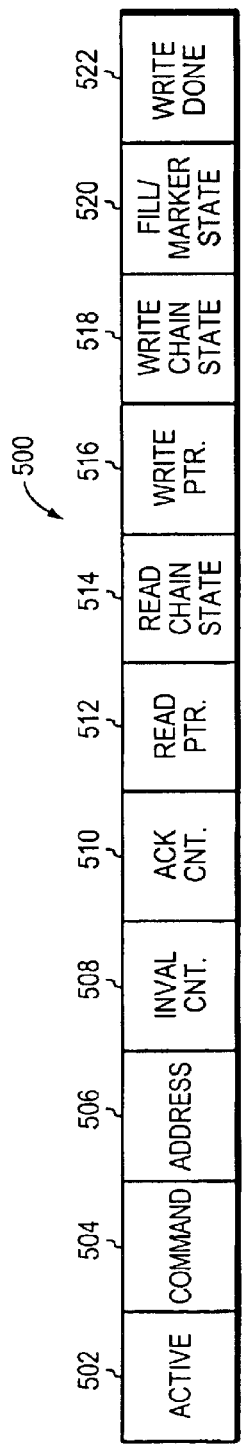
FIG. 5 is a highly schematic block diagram of a miss address file (MAF) entry.

The MAF table 414 is organized at least logically as a table or array having a plurality of rows and columns whose intersections define cells for storing information. FIG. 5 is a highly schematic block diagram of an exemplary row or entry 500 of MAF table 414 (FIG. 4). Entry 500 has a plurality of fields including a 1-bit active field or flag 502, which indicates whether the respective entry 500 is active or inactive, i.e., whether the outstanding request represented by entry 500 is complete or not. A request that is not yet complete is considered active. Entry 500 further includes a command field 504 that specifies the particular command that is outstanding, and an address field 506 that specifies the memory address corresponding to the command. Entry 500 additionally includes an invalid count (Inval Cnt.) field 508, an acknowledgement count (Ack Cnt.) field 510, a read pointer (ptr.) field 512, a read chain state field 514, a write pointer field 516, a write chain state field 518, a Fill/Marker state field 520 and a write-done field 522.

Each state machine engine 416, 418 and 420 (FIG. 4) can transition a respective MAF entry 500 among a plurality of states. The Fill state machine engine 416 stores the current fill state of a MAF entry 500 in the Fill/Marker state field 520. The read chain state machine engine 418 stores the current read chain state in field 514, and the write chain state machine engine 420 stores the current write chain state in field 518.

Figure 6:
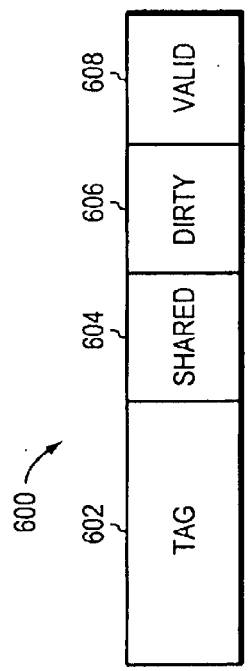
FIG. 6 is a highly schematic block diagram of a cache tag entry.

The cache tags storage device 406 (FIG. 4) is also organized at least logically as a table or array having a plurality of rows and columns whose intersections define cells for storing information. FIG. 6 is a highly schematic block diagram of an exemplary row or entry 600 of the cache tags storage device 406. As mentioned above, each entry of the cache tags storage device 406, including entry 600, corresponds to a particular cache line stored at the processor's cache(s). Cache tag entry 600 includes a tag field 602 that specifies the memory address of the respective cache line, and a series of status flags or fields, including a shared flag 604, a dirty flag 606 and a valid flag 608. The valid flag 608 or bit indicates whether the respective cache line has a copy of valid data in it, i.e., whether the data is coherent with the latest version of the block. The shared flag 604 or bit indicates whether more than one processor cache in the SMP system has a copy of the block. The dirty flag 606 or bit indicates whether the cache line has been modified or changed by the processor and is thus more up-to-date than the version stored at main memory.

As explained herein, processors configured to operate in the non dirty-shared mode may not include a shared flag 604.

A CPU 404, I/O subsystem and memory subsystem 302 of the SMP system 300 may each be referred to generally as an "entity", and the entities of the SMP system 300 interact with each other by issuing "command packets" or simply "commands" to each other. Commands may be classified generally into three types: Requests, Probes and Responses. Requests are commands that are typically issued by a processor when, as a result of executing a load or store operation, it must obtain a copy of data. It should be understood that the term "data" as used herein is broadly defined to include instructions as well as data. Requests are also used to gain exclusive ownership or write access to a piece of data, e.g., a memory block. Requests include Read commands, Read_Modify (ReadMod) commands, Change_to_Dirty (CTD) commands, and Write_Back (WB) commands, among others. Probes also known as snoops are commands issued to one or more processors requesting data and/or cache tag status updates. Probe commands include Forwarded_Read (FRead) commands, Forwarded_Read_Modify (FReadMod) commands, and Invalidate (Inval) commands, among others. Responses are commands which carry requested data to a processor or acknowledge some request. For Read and ReadMod commands, the responses are Fill and Fill_Modify (FillMod) commands, respectively. For CTD commands, the response is a CTD_Success command. For WB commands, the response may be a WB_Acknowledgement command.

Figure 7:
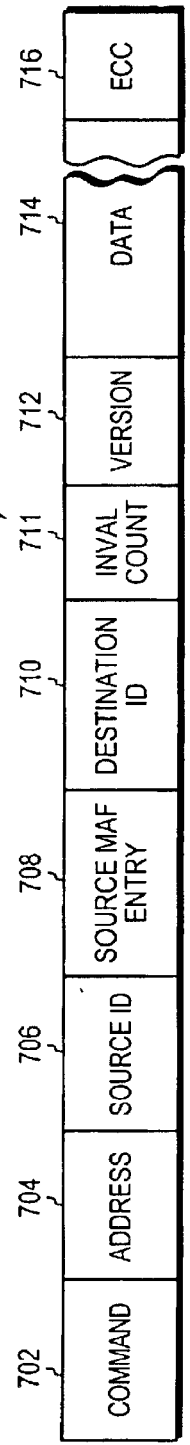
FIG. 7 is a highly schematic block diagram of a command packet.

FIG. 7 is a highly schematic, partial block diagram of a preferred form of a command packet 700. The command packet 700 is organized into a plurality of fields. Specifically, command packet 700 has a command field 702 which carries an operation code (opcode) indicating the type of command, e.g., Read, ReadMod, Fill, etc., the packet is. An address field 704 specifies the physical address of the memory block to which the command refers. A source identifier (ID) 706 specifies the entity that sourced or issued the command 700. A source MAF entry field 708 specifies the particular entry within the MAF table that has been established at the source entity for the command 700. A destination nation ID 710 specifies the intended recipient or target of the command 700. An Inval Count field 711 specifies the number of invalidate acknowledgements that are to be received. A version field 712 may be included to specify a particular version of the memory block being requested. Command packet 700 may further include a data field 714 for carrying a memory block, and an error correction code (ECC) field 716.

It should be understood that each processor of the system is preferably assigned a unique processor identifier (PID), and that each memory subsystem and I/O subsystem is also assigned a unique ID. For commands issued by a processor, the processor's PID is entered in the source ID field 706. For commands directed to a processor, the target processor's PID is entered in the destination ID field 708. For commands directed to memory, the destination ID field 708 is loaded with the ID assigned to the referenced memory block's home memory subsystem.

Memory reference operations, such as reads, are preferably executed by the SMP system 300 through a series of steps whereby each step involves the exchange of a particular command among the entities of the SMP system 300.

Virtual Channels

To avoid deadlock, the cache coherency protocol of the present invention utilizes a plurality of channels established within the SMP system 300. Preferably, the channels share physical resources and are thus "virtual" channels. Each virtual channel, moreover, is assigned a specific priority relative to the other virtual channels so that, by appropriately assigning the different command types or packets to different virtual channels, the SMP system 300 can also eliminate flow dependence. In general, commands corresponding to later steps in a series are assigned to higher priority virtual channels than the commands corresponding to earlier steps in the series.

In accordance with the present invention, the SMP system 300 maps commands into at least three (3) different virtual channels. A Q0 channel carries command packet requests for memory space read and write transactions. A Q1 channel accommodates probe command packets to Q0 requests. A Q2 channel carries response command packets to Q0 requests.

A suitable mechanism for implementing virtual channels in a large SMP system is described in U.S. Pat. No. 6,014,690, issued Jan. 11, 2000 for EMPLOYING MULTIPLE CHANNELS FOR DEADLOCK AVOIDANCE IN A CACHE COHERENCY PROTOCOL, which is hereby incorporated by reference in its entirety.

Those skilled in the art will recognize that other and/or additional virtual channels could be defined. The three virtual channels described above, moreover, can be configured to carry other types of command packets. The Q0 virtual channel, for example, may also accommodate command request packets for programmed input/output (PIO) read and write transactions, including control status register (CSR) transactions, to input/output (I/O) address space. Alternatively, a separate QIO virtual channel having a priority below the Q0 virtual channel can be defined to accommodate PIO read and write transactions.

In the illustrative embodiment, the processors and memory subsystems of the SMP 300 system cooperate to execute a write-invalidate, ownership-based cache coherency protocol. "Write-invalidate" implies that when a processor wishes to modify a cache line, it causes copies of the cache line that may be located in other processors' caches to be invalidated, rather than updating them with the new value. "Ownershipbased" implies there is always an identifiable owner for a cache line, whether it is memory, an I/O subsystem or one of the processors of the SMP system 300. The owner of a cache line, moreover, is responsible for supplying the most up-to-date value upon request. A processor may own a cache line "exclusively" or "shared". If a processor has exclusive ownership over a cache line, it may modify or update the cache line without informing the system. Otherwise, it must inform the system and potentially invalidate copies located in other processors' caches.

Directory 426, like the MAF, is also organized at least logically as a table or array having a plurality of rows and columns whose intersections define cells for storing information. FIG. 8 is a highly schematic block diagram of directory 426. Directory 426 is preferably organized into two regions or areas, a main directory region 802 and a writeback directory region 804. A plurality of rows 806–810 span both regions 802 and 804 of the directory 426. Several versions of row 806, which are described below, are shown. Within each region 802 and 804, a plurality of columns are defined for specifying the type of information stored in the directory's entries. The main directory region 802, for example, has an owner/sharer column 814 for storing the identifier (ID) assigned to the entity that owns the cache line, and a sharer list column 816 for indicating which entities, if any, have a shared copy of the cache line.

The sharer list column 816 is preferably configured to operate in one of two different modes. In a first mode, sharer list column 816 is organized into two sharer columns 816a and 816b each of which can store the ID assigned to a single entity, such as a processor, of the SMP system 300 that has a shared copy of the respective cache line. If a third entity is to be added as a sharer, the sharer list column 816 converts from two sharer columns 816a and 816b to a single coarse sharer vector column 816c. Each bit of the sharer vector column 816c corresponds to and thus identifies a set of one or more sockets 202 of system 300. If a bit is asserted, then at least one processor located within the set of sockets associated with the asserted bit has a copy of the respective cache line. The set of sockets may or may not correspond to a node. Entries 807 and 809 illustrate the first mode, and entries 808 and 810 illustrate the second mode. Main region 802 further includes an unused column 818 and an error correction code (ECC) column 820 for storing an ECC value calculated for the data in fields 814–818.

The write-back region 804 has a writer column 822, an unused column 824 and an ECC column 826. As explained herein, the contents of the owner/sharer column 814 of the main region 802 together with the contents of the writer column 822 of the write-back region 804 determine who owns the respective cache line and thus where the most up-to-date version is located within the SMP system 300. The ECC column 826 stores an ECC value calculated for the data in fields 822 and 824.

The unused fields 818 and 824 are provided in order to support modifications to the protocol and/or increases in the size of the address or other fields. It should be understood that one or more bits of unused column 814 may be used to signify whether the corresponding entry's sharer list 816 is in individual sharer mode, i.e., fields 816a and 816b, or in coarse sharer vector mode, i.e., sharer vector field 816c.

In the preferred embodiment, directory 426 is actually located within the memory unit 428 itself along with the memory blocks, and is not a separate memory component. That is, each memory address indexes to an area of the memory device 428 that is preferably divided into three regions. The first region corresponds to the main directory region, the second region corresponds to the write-back region, and the third region corresponds to the data contents of the memory block.

In the illustrative embodiment, the owner/sharer field 814 is 10-bits, the sharer list field 816 is 16-bits, thereby supporting either two 8-bit sharer IDs or one 16-bit coarse sharer vector, and the unused and ECC fields 818, 820 are each 7-bits. The main directory region 802 is thus 5-bytes. For the write-back region 804, the writer field is 9-bits, the unused field 824 is 1-bit and the ECC field 826 is 6-bits, thereby making the writeback region 2-bytes. The third region includes the cache line, which may be 128-bytes, and a 9-byte ECC field (not shown) calculated for the memory block for a total of 137-bytes. Accordingly, for each memory block, the memory area comprises 144-bytes of information in total.

As mentioned above, each CPU 404 of the SMP system 300 may access portions of memory stored at the two memory subsystems 302 coupled to its socket, i.e., a "local" memory access, or at the memory subsystems coupled to any other socket of the SMP system 300, i.e., a "remote" memory access. Because the latency of a local memory access will differ from the latency of a remote memory access, the SMP system 500 is said to have a non-uniform memory access (NUMA) architecture. Further, since the system 300 provides coherent caches, the system is known as a cache-coherent NUMA (CC-NUMA) system.

It should be understood that the present invention may be used with other computer system designs or architectures.

Operation of the Distributed Directory

Each memory subsystem 302 preferably includes a built-in, self test (BIST) engine (not shown) that is used during initialization of the subsystem. The BIST engine initializes the contents of the memory device 428, including the directory contents and ECC values, by setting them to predetermined values as one of the final steps of the self test. It should be understood that firmware, rather than or in addition to a BIST engine, may be used for initialization purposes.

As data is brought into the SMP system 300, it is loaded into the memory devices 428 of the memory subsystems 302 in units of memory blocks. As each memory block is stored at a memory subsystem 302, the memory controller 424 computes a first error correction code (ECC) value for the block which is stored along with the cache line as described above. Data may be brought into the memory subsystems 302 from any number of sources, such as floppy disk drives, hard disk drives, tape drives, optical or magneto-optical drives, scanners, sound cards, etc. The memory controller 424 also loads the owner/sharer field 814 in the main region 802 and the writer field 822 in the write-back region 804 with the same value, preferably the ID assigned to the memory subsystem. The remaining fields of each entry are preferably de-asserted and/or set to null, e.g., to zero. The memory controller 424 also computes a second ECC value for the information in the main directory region 802, and a third ECC value for the information in the write-back region 804. The second ECC value is stored in ECC field 820 while the third ECC value is stored in ECC field 826. Entry 806a illustrates how a directory entry would appear upon initialization of the memory subsystem.

Read Command

Suppose a processor, e.g., processor P0, of the SMP system 300 wishes to read a memory block that is not present in its cache. Processor P0 preferably issues a Read command on the Q0 virtual channel specifying the address of the desired memory block. Processor P0 also directs MAF entity 408 to create an entry in the MAF table 414 for this request. MAF entity 408 asserts the active flag 502, loads the command field 504 with the opcode associated with a Read command and enters the block's address in the address field 506. State machine 416 transitions the Fill/Marker state associated with the entry and reflected in field 520 from the idle state to the active state. The remaining fields of the MAF entry 500 may be de-asserted. The SMP system 300 routes the Read command from processor P0 to the home memory subsystem for the specified memory block, e.g., subsystem 302a.

At the home memory subsystem 302a, the memory controller 424 accesses the area of memory device 428 specified by the address contained in the Read command, and retrieves the directory entry, e.g., entry 806a, for the block. The memory controller 424 first examines the information stored in the owner/sharer field 814 and the writer field 822 of the identified entry 806a. Because the contents of both the owner/sharer field 814 and the writer field 822 are the same, i.e., memory, the memory controller 424 concludes that it is the owner of the cache line, and that the version stored at its memory device 428 is the most up-to-date version. Accordingly, the memory controller 424 responds to the Read command by sending processor P0 a copy of the block from memory device 428.

Specifically, the memory controller 424 issues a Fill command on the Q2 virtual channel that includes the address and data of the requested block. The memory controller 424 also adds P0's PID to the list of sharers maintained in the sharer column 816. Assuming P0 is the first entity to request a shared copy of the cache line, memory controller 424 enters P0's PID into sharer field 816a. As P0 has only requested a shared copy of the cache line, the memory controller 424 does not modify the contents of the owner/sharer field 814. The memory controller 424 also does not modify the contents of the writer field 822. Entry 806b (FIG. 8) illustrates how entry 806a would appear following the updates performed by the memory controller 424 in response to the Read command from P0.

It should be understood that, when a memory block is read out of a memory device 428, the memory controller 424 preferably checks parity information, e.g., a parity bit, to determine whether the retrieved data has been corrupted. If so, the memory controller 424 utilizes the previously computed ECC value to recover the data. The recovered data is then sent to the requesting entity. The recovered data may also be loaded back into the memory device 428, overwriting the corrupted data. Controller 424 also checks a parity bit when reading information from the main directory region 802. And, if the information in the main directory region 802 is updated, such as by adding P0 to the sharer list 816, the memory controller 424 computes a new ECC value and stores it in ECC field 820.

In some SMP systems that use ordered Q1 commands, a fill marker mechanism is employed to inform a processor that its request, such as a Read command, has accessed the home memory's directory, and that the requested data is in the process of being returned to the processor. Typically, the fill marker mechanism is implemented through the issuance of a separate Marker command by the memory subsystem to the processor upon access to the directory. In the illustrative embodiment, memory controller 424 does not send a separate Marker command message in response to Read commands. Nonetheless, those skilled in the art will recognize that a fill maker mechanism could be implemented by SMP system 300.

At processor P0, the Fill command is received at the probe/response queue 410, and the MAF controller 412 retrieves the entry from MAF table 414 corresponding to the received Fill command. State machine 416 transitions the state reflected in the MAF state field 520 from the active state to the idle state, and the matching entry is rendered inactive by de-asserting the active flag 502. The data included with the Fill command is loaded into P0's cache and the respective entry 600 of the cache tags storage device 406 is up-dated. Specifically, the tag field 602 is loaded with the address of the received block, the shared and valid flags 604 and 608 are asserted and the dirty flag 606 is de-asserted.

ReadMod Command

Suppose that, instead of wanting just read access to a cache line, processor P0 wishes to obtain write access over a cache line that is not present in its cache.

In this case, processor P0 preferably issues a Read_Modify (ReadMod) command on the Q0 virtual channel specifying the address of the desired cache line. Processor P0 also directs MAF entity 408 to establish an entry in the MAF table 414 for the outstanding ReadMod command. MAF controller 412 asserts the active flag 502, loads the command field 504 with the opcode associated with a ReadMod command, and enters the address of the block in the address field 506. In addition, state machine 416 transitions the state as reflected in MAF state field 520 from the idle state to the active state. The remaining fields of the MAF table entry 500 may be de-asserted. System 300 routes the ReadMod command from processor P0 to the block's home memory subsystem 302a.

At memory subsystem 302a, the memory controller 424 accesses the area specified by the address of the ReadMod command, and retrieves the corresponding directory entry, i.e., entry 806a. The memory controller 424 first examines the information stored in the owner/sharer field 814 and the writer field 822 of the identified entry 806a. Because the contents of both the owner/sharer field 814 and the writer field 822 are the same, i.e., they both indicate memory, the memory controller 424 concludes that it is the owner of the block, and that the version stored at its memory 428 is the most up-to-date version. The memory controller 424 also checks the sharer column 816 to see whether any other entities have a shared copy of the requested cache line. In this case, no entities have a shared copy of the cache line. Accordingly, the memory controller 424 responds to the ReadMod command by sending processor P0 a copy of the block from its memory device 428.

Specifically, the memory controller 424 issues a Fill_Modify (FillMod) command on the Q2 virtual channel that includes the address and data of the requested block. Because P0 is requesting write access to the block, the memory controller 424 inserts P0's PID into the entry's owner/sharer field 814 replacing the current value, i.e., memory. Nonetheless, the memory controller 424 does not modify the contents of the entry's writer field 822. Entry 806c (FIG. 8) illustrates how entry 806a would appear following the updates performed by the memory controller 424 in response to the ReadMod command from P0.

If, at the time the ReadMod command is received at the memory controller 424, the sharer column 816 of entry 806a indicated that one or more entities have a shared copy of the block, the memory controller 424 would issue an Invalidate (Inval) command on the Q1 virtual channel to each such entity directing them to invalidate their copies of the block. Supposing there were two such entities, the memory controller 424 would also have set an invalid count within the FillMod command to two. When the FillMod command is received at P0, the corresponding MAF entry is located and the Inval Count field 508 is set to two as specified by the FillMod command.

In response to the Inval commands from the memory controller 424, the other entities invalidate their copies of the cache line and send Invalidate_Acknowledgement (IAck) commands on the Q2 virtual channel to P0. In response to each IAck command, P0 increments the Ack Count field 510 of the respective MAF entry 500 by one. The MAF controller 412 continuously checks the values of the Inval Count and Ack Count fields 508 and 510. When the two values are the same, indicating that each and every entity that had a shared copy of the cache line has invalidated its copy, P0 considers the block to be consistent and available to it for processing.

Suppose, after granting P0 write access over the block, another processor, e.g., processor P1, issues a Read command for the block. The Read command is routed by the SMP system 300 to memory subsystem 302a which is the block's home memory. The memory controller 424 locates the directory entry, i.e., entry 806c, corresponding to this cache line and examines the information stored in the owner/sharer field 814 and the writer field 822 of the identified entry 806a. As the owner/sharer field 814 indicates P0 and the writer field 822 indicates memory, the two values are not the same. In this case, the memory controller 424 concludes that the entity specified in the owner/sharer field 814, i.e., P0, rather than the memory subsystem itself, is the owner and has the most up-to-date version of the block. Accordingly, the memory controller 424 issues a Forwarded_Read (FRead) command on the Q1 virtual channel to P0. The memory controller 424 updates the sharer list column 816 for this directory entry to reflect that processor P1 has a shared copy of the block. The memory controller 424 does not, however, modify either the owner/sharer field 814 or the writer field 822. Entry 806d (FIG. 8) illustrates how entry 806c would appear following the updates performed by the memory controller 424 in response to the Read from P1.

P0 responds to the FRead by sending a copy of the block from its cache to P1 on the Q2 virtual channel.

ReadMod Command with other Processor as Owner

Suppose a third processor, P2, now issues a ReadMod command for this same memory block. The ReadMod is routed by the SMP system 300 from processor P2 to memory subsystem 302a which is the block's home memory. The memory controller 424 accesses the area of memory device 428, and retrieves the directory entry, i.e., entry 806d, corresponding to the block. Controller 424 then examines the information stored in the entry's owner/sharer field 814 and writer field 822. As the two values are not the same, the memory controller 424 concludes that P0, rather than the memory subsystem itself, is the owner and thus has the most up-to-date version of the block. Memory controller 424 also examines the sharer list column 816 and determines that P1 has a shared copy of the block. In this case, the memory controller 424 issues a Forwarded_Read_Modify (FReadMod) command on the Q1 channel to P0, and an Inval command on the Q1 channel to P1. In the illustrative embodiment, the FReadMod command also carries an inval count of two. The memory controller 424 also updates the directory entry to reflect that P2 is now the owner/sharer of the block and that there are no sharers. The memory controller 424 does not modify the writer field 822. Entry 806e (FIG. 8) illustrates how entry 806d would appear following the updates performed by the memory controller 424 in response to the ReadMod command from P1.

In response to the FReadMod command, P0 issues a FillMod command that includes the block on the Q2 virtual channel to P2. The FillMod command preferably has an Inval Count of two, reflecting that there are two entities with a copy of the cache line, i.e., P0 and P1. P0 also invalidates its copy of the cache line by de-asserting the cache tag entry's valid flag 608, and sends P2, either individually or as part of the FillMod command, an IAck command on the Q2 channel. In response to the Inval command, P1 also invalidates its copy of the cache line and sends an IAck command to P1. As each IAck command is received at P1, its MAF controller 412 increments the Ack Count field 510 of the corresponding MAF entry 500 by one. When the Inval Count and Ack Count fields 508 and 510 are equal, the cache line is considered to be consistent and may be processed, e.g., read and/or modified, by P2.

Write Back Command

When P2 is finished with the cache line, it writes the cache line back to its home memory subsystem 302a in order to make room in its cache for other cache lines. In the illustrative embodiment, the processor module 402a (FIG. 4) does not include a separate write-back or victim buffer. Instead, a cache line that is being victimized from the processor's cache is written-back to memory directly from the cache.

When a processor, such as P2, wishes to write-back a cache line over which it has write access, it first checks the corresponding tag entry 600. Specifically, P2 confirms that the dirty flag 606 and the valid flag 608 are both asserted, thereby indicating that P2 is the owner of the cache line to be written back and that the cache line is still valid. Only those memory blocks that were acquired by a processor with a request for exclusive or write access may subsequently be written back to main memory. If the dirty flag 606 is not asserted and/or the cache line is invalid, P2 is precluded from writing the cache line back to memory. P2 also checks its MAF table 414 to see if a MAF entry 500 already exists for the cache line to be written back. If there is a MAF entry 500, P2 confirms that the entry is inactive, that there are no outstanding IAcks for the cache line, i.e., that the Inval Count field 508 equals the Ack Count field 510, that the read pointer and write pointer fields 512 and 516 are both invalid, and that the Fill/Marker state field 520 is set to the idle state. If there are one or more outstanding IAcks or the Fill/Marker state is active, the processor is precluded from writing the cache line back to memory.

Assuming the cache line is valid and dirty, and that MAF entry satisfies the above checks, a processor, such as P2, simply issues a Write_Back (WB) command to main memory in order to write the block back to memory. The WB command, which includes the modified block and its address, is preferably issued on the Q0 virtual channel. The tag entry 600 may then be invalidated and the entry made available to store a new cache line. No copy of the cache line being written back is kept at processor P2 upon issuance of the WB command. In the preferred embodiment, the processor P2 also creates a new entry 500 in the MAF table 414 for the WB command. The processor P2 asserts the active field 502, enters the opcode associated with the WB command into the command field 504 and enters the block's address into the address field 506.

The WB command is routed by the SMP system 300 to the block's home memory subsystem 302a. At the memory subsystem 302a, the memory controller 424 responds to the WB command by storing the modified data appended to the WB command in memory device 428 overwriting the previous contents of the memory block. The memory controller 424 also updates the directory entry's write-back region 804. Specifically, the writer field 822 of the directory entry, i.e., entry 806e, for the block being written back is updated with the PID of the processor that issued the WB command, i.e., processor P2. Significantly, neither the memory controller 424 nor the processor make any change to the directory entry's owner/sharer field 814. Entry 806f (FIG. 8) illustrates how entry 806e would appear following the write-back operation by P2.

In addition to storing the modified data at the memory device 428, the memory controller 424 preferably computes a new ECC value for the data and stores this new ECC value along with the block. Furthermore, because it has changed the contents of the write-back region 804, the memory controller 424 also computes a new ECC value for the information in region 804 and stores this new value in the ECC field 826.

After updating the entry's writer field 822, the memory controller 424 returns a WB_Acknowledgement (WB_Ack) command to P2. The WB_Ack is preferably issued on the Q2 virtual channel, although it may alternatively be issued on the Q1 virtual channel. In response to receiving the WB_Ack command, P2 causes the MAF entry 600 that was created for the WB command to be deactivated, e.g., by de-asserting the active field 502.

Suppose that, following P2's write-back of the block, some other processor in the SMP system 300, e.g., processor P3, now issues a Read command for the block. As described above, the Read command is routed by the SMP system 300 to the block's home memory subsystem 302a. The memory controller 424 responds to the Read command by accessing the directory entry, i.e., entry 806f, for the block. The memory controller 424 compares the contents of the owner/sharer field 814 with the contents of the writer field 822. Because the WB command from P2 modified the writer field 822 but not the owner/sharer field 814, the values in the two fields are now the same, i.e., they both contain P2's PID. As the values stored in the two fields 814, 822 are the same, the memory controller 424 concludes that it is the owner of the requested block, and that it has the most up-to-date version in its memory device 428. Controller 424 reaches this conclusion even though the owner/sharer field 814 does not indicate memory as the owner of the block. Because the two fields 814, 822 contain the same value, the memory controller 424 responds to the Read command from processor P3 by issuing a Fill command on the Q2 channel which includes a copy of the block taken from its memory device 428. The memory controller 424 also updates the directory entry by adding P3 to the sharer list field 816. The memory controller 424 does not modify either the owner/sharer field 814 or the writer field 822. Entry 806g (FIG. 8) illustrates how entry 806f would appear following the Read command from processor P3.

Except for when the last entity to have written a block back to memory again requests write access to the block, the writer field 822 of the directory's write-back region 804 is only modified in response to a WB command from a processor (or other system entity) performing a write-back of data to memory. The WB command, moreover, does not result in the contents of the owner/sharer field 814 being read or modified. The memory controller 424, moreover, updates the contents of a directory entry immediately in response to the received command, e.g., Read command, ReadMod command, WB command, etc. Such updates are not dependent upon the memory controller 424 receiving additional information, such as ACKs, from system entities.

It should be understood that write-backs must be strictly serialized. That is, at any point in time, the cache coherency protocol ensures that only a single processor can issue a WB command for a given memory block. In the illustrative embodiment, this is accomplished by permitting only a single entity to have write or exclusive access to a given memory block. A second entity requesting write access over the given memory block is not granted such access until the previous owner has either been invalidated or has written the memory block back to main memory. Accordingly, at any given point in time, the cache coherency protocol permits only a single entity to issue a WB command for a given memory block.

Invalidate to Dirty

As indicated above, a memory block or cache line, which may be 128-bytes, is the minimum unit of information, e.g., data and/or instructions, that is moved about the SMP system 300. When an entity intends to write to something less than a full memory block, such as a quadword which is 32-bytes, it typically issues a ReadMod command, and in response receives the full memory block including the 32-bytes of interest. The entity then writes the new data to the identified quadword, leaving the remaining portions of the memory block unchanged. The entire memory block, including the modified quadword, can then be written back to main memory. If an entity, such as a processor or an I/O subsystem on behalf of a peripheral device, intends to write the entire contents of a memory block, e.g., in connection with a direct memory access (DMA) write transaction, it may issue an Invalidate_to_Dirty (I2D) command. Since the entity is writing to the entire memory block, it does not care what the current version of the memory block is.

When an I2D command is received at the block's home memory subsystem, the memory controller 424 retrieves the respective directory entry, and issues Invals to the owner and sharer(s), if any, thereby causing them to invalidate their copies of the block. The memory controller also enters the ID assigned to the source of the I2D command in the entry's owner field, and returns a Success command to the source of the I2D command. The Success command specifies how many entities had a copy of the block in their caches. Upon invalidating their copies of the block, the owner and sharers, if any, issue IAcks to the entity that sourced the I2D command. Once the source has received the Success command and an IAck from each entity that had a copy of the block, it can write the new data to memory by appending the modified data to a WB command. The memory controller responds to the WB command with a WB_Ack command.

Full Block Write

A Full_Block_Write (FBW) command, like an I2D command, is typically utilized by an I/O subsystem when performing a DMA write transaction. However, unlike the I2D, which does not carry data, the FBW command carries the new memory block being written. At the home memory subsystem, the memory controller 424 retrieves the respective directory entry. The memory controller 424 issues Invals to the owner and sharer(s), if any, thereby causing them to invalidate their copies of the block. The memory controller 424 also enters the ID assigned to the source of the FBW command in the directory entry's owner and writer fields and stores the data in main memory. The block's previous owner and sharer(s), if any, respond to the Invals by invalidating their copies of the memory block and issuing IAcks to the source of the FBW command. The source collects the IAcks for consistency purposes.

Dirty-Shared and Non Dirty-Shared Data Processing Entities

As shown, the processors 404 and directories 426 cooperate to execute a generalized low occupancy cache coherency protocol. The protocol is "generalized" in that, as described herein, it can support processors that share memory blocks that are in the dirty state as well as processors that are precluded from sharing memory blocks that are in the dirty state. As mentioned above, a dirty-shared processor responds to a snoop read, e.g., a FRead command, that identifies a block in the dirty state by sending a copy of the block from its cache to the initiator of the snoop read. The dirty-shared processor does not, in response to the snoop read, write a copy of the block back to main memory. Accordingly, multiple processors may have a "dirty" copy of a memory block, although only one processor, the owner, can write the block back to main memory. Non-dirty shared processors do not support dirty blocks being held in more than one cache. In particular, if a non-dirty shared processor receives a snoop read identifying a block in the dirty state, the processor writes the block back to main memory. The non-dirty shared processor may return the dirty block to main memory but also forward a copy of the block from its cache to the initiator of the snoop read or require it to obtain the block from memory.

The protocol is also considered a "low occupancy" protocol, because of the following attributes. First, each command only has to access the directory 426 once. Second, directory changes are deterministically based on the current directory state and the type of the received command. That is, the resulting state or form of a directory entry is solely a function of the current state or form of the entry and the received command. Third, the directory 426 neither creates nor requires any transient states or the return of acknowledgements in order to maintain coherency. Accordingly, once the directory 426 has updated the appropriate fields and issued the required commands, e.g., FReadMod, Invals, etc., it can immediately process another command for the same memory block even though the previous commands have yet to reach their targets.

Preferably, the SMP system 300 does not include a single, total ordering point for all references issued to the shared memory. Each directory 426, however, represents or provides a local serialization point for requests directed to the memory blocks of the respective memory subsystem 302. That is, as indicated above, the memory controller 418 imposes a serial order on all requests to the same memory block. To improve efficiency, the memory controller 418 may be configured to process requests to different memory blocks simultaneously or substantially simultaneously, e.g., through the use of multiple, interleaved memory banks.

In accordance with the preferred embodiment of the present invention, the virtual channels, i.e., the logic, fabric links, and other resources on which the virtual channels are built, must guarantee delivery of all commands within the SMP system 300. The cache coherency protocol assumes that all commands issued in connection with a memory reference operation will be received by their intended targets.

FIGS. 9 and 10 show an exemplary exchange of commands among a plurality of data processing entities illustrating the operation of the present invention.

Figure 9A:
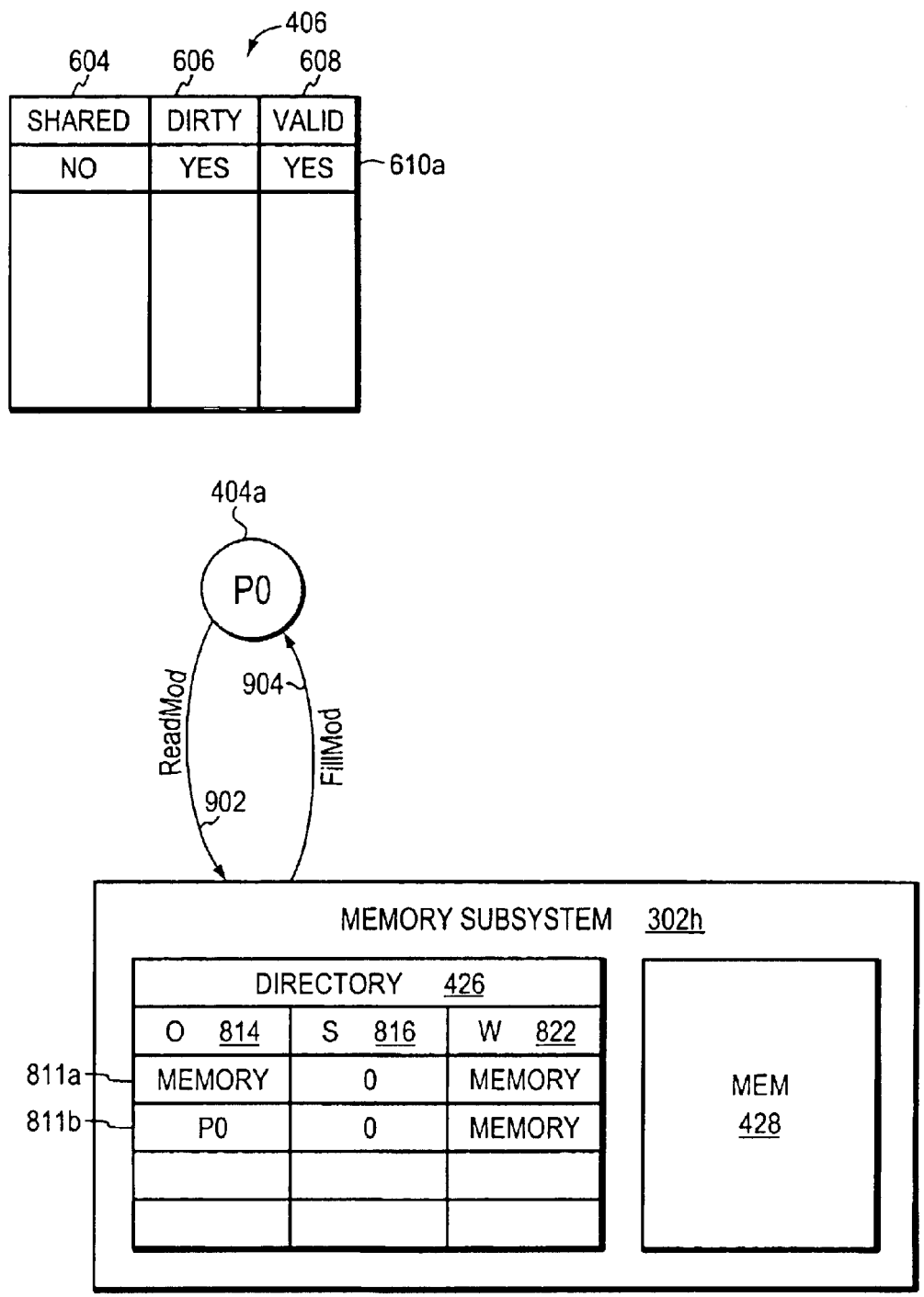
FIGS. 9 and 10 illustrate exemplary exchanges of command packets between a plurality of data processing entities and a memory subsystem.
Figure 9B:
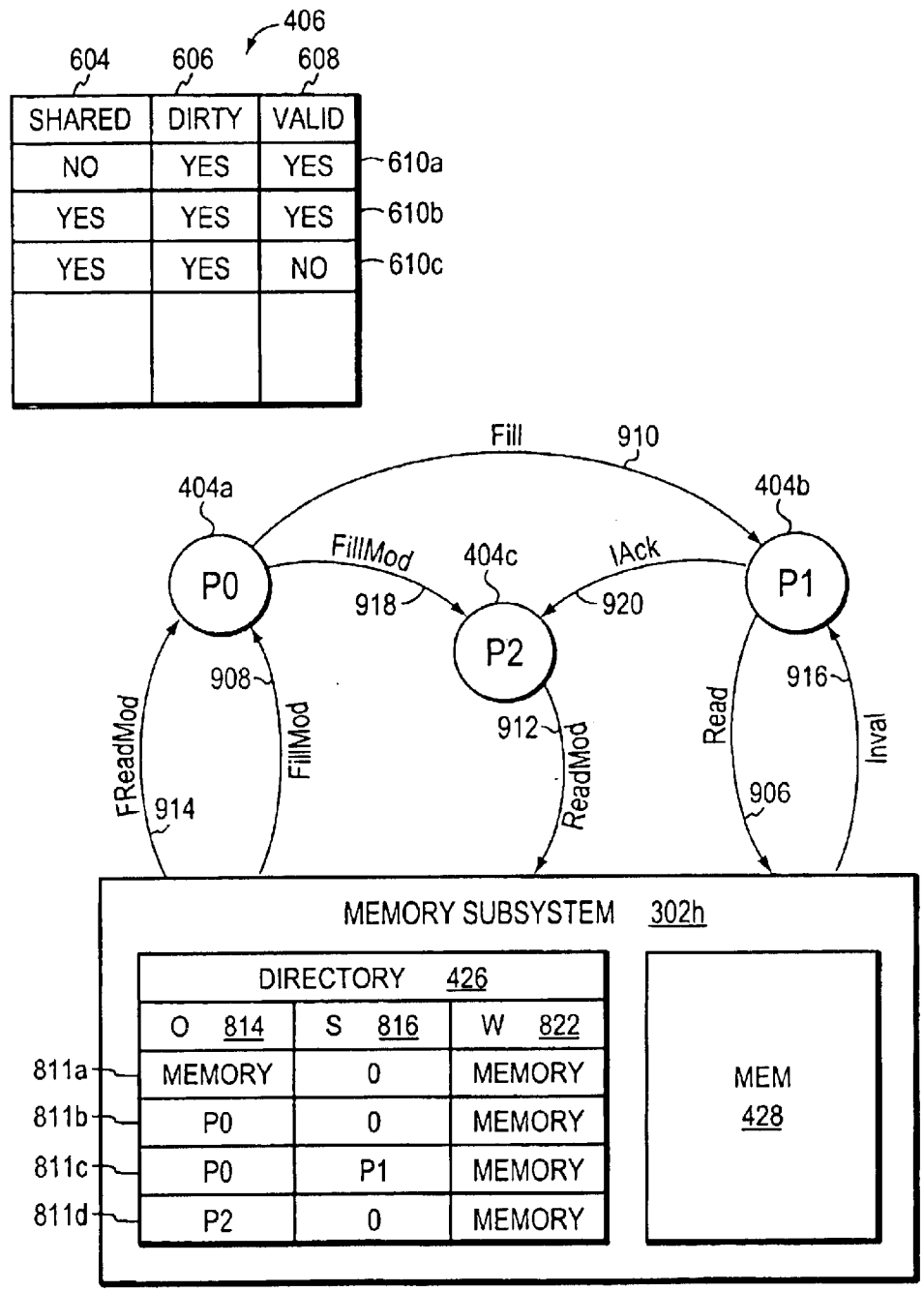

Referring to FIG. 9A, suppose that a processor, e.g., processor P0 also designated by reference numeral 404a, issues a ReadMod command 902 on the Q0 virtual channel requesting write access to a specified memory block. The ReadMod command 902 is routed to the home memory subsystem, e.g. memory subsystem 302h having a directory 426 and one or more memory devices (MEM) 428. The memory controller 424 (FIG. 4) accesses the directory entry, e.g., entry 811a (FIG. 9A) for the specified memory block. Directory entry 811a indicates that memory is both the owner and last writer of the specified memory block. Accordingly, the memory controller 424 issues a FillMod command 904 on the Q2 virtual channel to processor P0 and updates the directory entry by inserting P0's PID in the owner field 814. Entry 811b illustrates how entry 811a would appear following the home memory subsystem's processing of the ReadMod command 902 from processor P0.

Suppose P0 is configured to operate in a dirty-shared mode. That is, P0 can share copies of memory blocks that are in the dirty state with other data processing entities, such as other processors. Accordingly, P0 preferably maintains at least three flags for each memory block stored in its cache: a valid flag, a dirty flag and a shared flag, as described above. Upon receipt of the FillMod command 904, P0 fills its cache (or a register) with the received memory block and updates the respective entry of its cache tags storage device 406, which is shown in part in FIG. 9A. Specifically, P0 asserts, e.g., sets to "1" or Yes, both the dirty and valid flags 606, 608 (FIG. 9A) and leaves de-asserted, e.g., set to "0" or No, the shared flag 604. Cache tags storage device entry 610a (FIG. 9A) illustrates how the entry would appear upon P0's receipt of the FillMod command 904. Before writing, e.g., modifying, the block, P0 confirms that both the valid and dirty flags 606, 608 are asserted, thereby indicating that the block is valid and that P0 has write access. P0 further confirms that the shared flag 604 is de-asserted, thereby indicating that no other entities are already using or relying on the current version of the block as stored in P0's cache.

Now, suppose another processor, e.g., processor P1 also designated by reference numeral 404b (FIG. 9B), issues a memory reference operation, such as Read command 906 on the Q0 virtual channel, requesting read access to the same memory block to which processor P0 obtained write access. The Read command 906 from P1 is also routed to memory subsystem 302h, and the memory controller 424 accesses the directory entry, i.e., entry 811b. Directory entry 811b indicates processor P0 as the current owner and memory as the last writer. As the two fields 814, 822 contain different values, the memory controller 424 concludes that processor P0, whose PID is stored in the owner/sharer field 814, is the current owner of the memory block.

Accordingly, the memory subsystem 302h issues a FRead command 908 on the Q1 virtual channel to processor P0. The FRead command 908 instructs P0 to service P1's read request out of P0's cache, which memory subsystem 302h considers to contain the most up-to-date version of the memory block. As part of its processing of the Read command 906, memory subsystem 302h also updates the directory 426 to reflect that P1 is now a sharer of the memory block. More specifically, the memory controller enters the PID assigned to processor P1 into sharer list field 816. Directory entry 811c (FIG. 9B) illustrates how entry 811b would appear upon the home memory subsystem's processing of the Read command 906.

When P0 receives the FRead command 908, it searches its cache tags storage device 406 based on the memory address carried by the command 908. The search results in a hit on P0's cache, as the valid flag 608 of the corresponding cache tag entry 610a indicates that the memory block is valid. Accordingly, P0 responds by issuing a Fill command 910 on the Q2 virtual channel to P1 carrying a copy of the memory block from P0's cache. P0 also updates its cache tag entry by asserting the shared flag 604 to indicate that another entity, i.e., P1, has a copy of the current version of the memory block from P0's cache. Cache tags entry 610b illustrates how entry 610a would appear following P0's processing of the FRead command 908. Because P0 is configured to operate in a dirty-shared mode, it does not return the memory block to the home memory subsystem 302h in response to the FRead command 908. P0 also leaves both the valid and dirty flags 608, 606 asserted. P0 can thus continue to read and use the memory block in its processing. Nevertheless, as the shared flag 604 has now been asserted, P0 cannot make any further changes or updates to the memory block. Furthermore, because the dirty and valid flags 606, 608 are also asserted, P0 cannot simply overwrite this block with a new memory block. Instead, to make this cache entry available to store another memory block, P0 must write back the current version to the home memory subsystem 302h.

Suppose another processor, e.g., processor P2 also designated by reference numeral 404c (FIG. 9B), issues a memory reference operation, such as ReadMod command 912 on the Q0 virtual channel, requesting write access to this same memory block. The ReadMod command 912 is routed to the home memory subsystem 302h which retrieves the directory entry 811c for the block. Directory entry 811c shows P0 as the owner, P1 as the only sharer, and memory as the last writer. The memory controller thus responds to P2's ReadMod command 912 by issuing an FReadMod command 914 on the Q1 virtual channel to P0 and an Inval command 916 on the Q1 virtual channel to P1. The home memory subsystem also updates directory entry 811c by inserting P2's PID in the owner field 814 (replacing P0) and setting to null the sharer field 816. Directory entry 811d indicates how entry 811c would appear following the home memory subsystem's processing of the ReadMod command 912 from P2.

When P0 receives the FReadMod command 914, it searches its cache tags storage device 406 based on the memory address carried by the command 914. The search results in a hit on P0's cache as the valid flag 608 of the corresponding cache tag entry 610b still indicates that the memory block is valid. Accordingly, P0 responds by issuing a FillMod command 918 on the Q2 virtual channel to P2 carrying a copy of the memory block from P0's cache. P0 also updates its cache tag entry 610b for the memory block. In particular, P0 de-asserts the valid flag 608 because only a single data processing entity is permitted to have write access to a given memory block at any time. Cache tag entry 610c indicates how entry 610b would appear following P0's processing of the FReadMod command 914. It should be understood that P0 may leave the shared and dirty flags 604, 606 in their current state or it may also de-assert these flags as well.

P1 responds to the Inval command 916 by invalidating its copy of the memory block. P1 also issues an IAck command 920 on the Q2 virtual channel to P2 indicating that P1 has indeed invalidated its copy of the memory block. It should be understood that P0 may issue a separate IAck to P2 or, as indicated above, P0's FillMod command 918 may additionally be used to confirm P0's invalidation of the memory block.

It should be understood that prior to P2's ReadMod command 912, other requests for read access to the memory block, like P1's Read command 906, would similarly be forwarded to P0 for servicing from its cache. As P0 already asserted the shared flag 604 in response to the first FRead, i.e., FRead command 908 initiated by P1, subsequent FRead commands would not cause any further changes to P0's cache tag entry. Furthermore, once P0 invalidated the cache tag entry in response to the FReadMod command 914, P0 is precluded from writing the memory block back to the home memory subsystem 302h. P0 can, however, reuse this cache tag entry to store a different memory block without notifying the home memory subsystem 302h.

FIGS. 10A–E illustrate a similar exchange of command packets as described in connection with FIG. 9, but this time at least one of the processors of the SMP system 300 is configured to operate in a non dirty-shared mode. In particular, suppose that a processor, e.g. processor P3 also designated by reference numeral 404d, is configured to operate in a non dirty-shared mode. Suppose further that P3 issues a ReadMod command 1002 on the Q0 virtual channel for write access to a specified memory block. The ReadMod command 1002 is routed to the home memory subsystem, e.g. memory subsystem 302h having a directory 426 and one or more memory devices (MEM) 428. The memory controller 424 (FIG. 4) accesses the directory entry, e.g., entry 812a (FIG. 10A) for the specified memory block. As shown in the owner and writer fields 814, 822, directory entry 812a indicates that memory is both the owner and last writer of the specified memory block. Accordingly, the memory controller 424 issues a FillMod command 1004 on the Q2 virtual channel to processor P3 and updates the directory entry by inserting P3's PID in the owner field 814. Entry 812b illustrates how entry 812a would appear following the home memory subsystem's processing of the ReadMod command 1002 from processor P3.

Figure 10A:
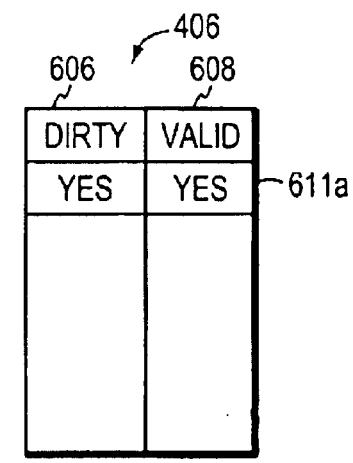
Figure 10A:
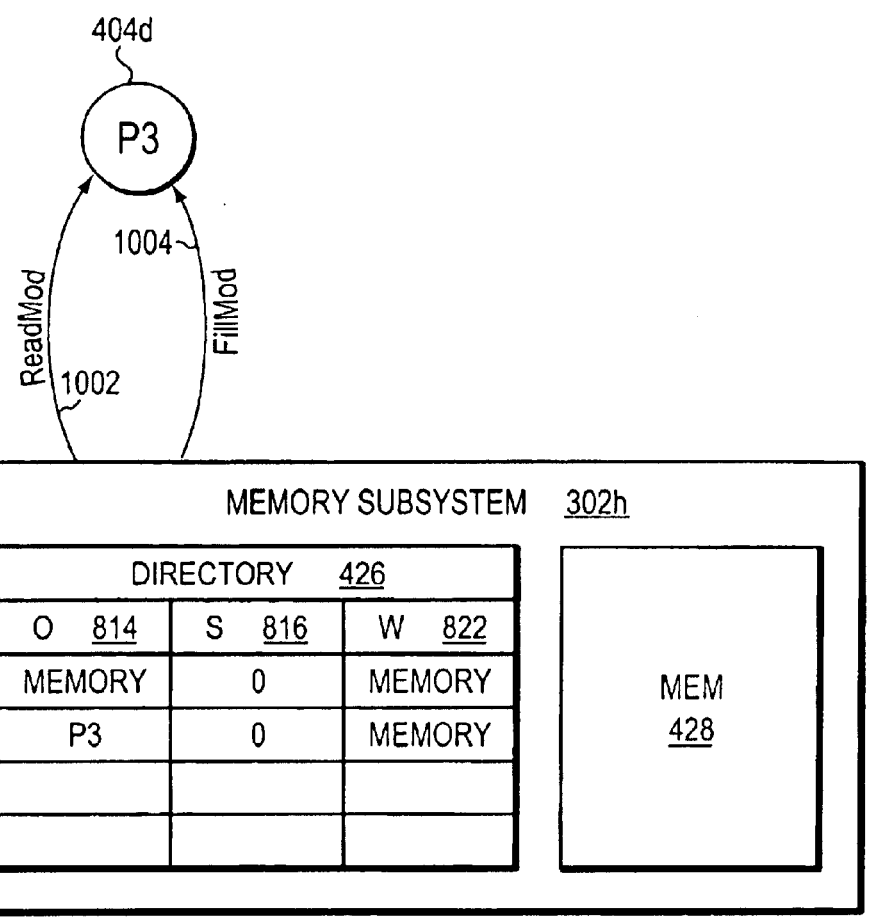
Figure 10B:
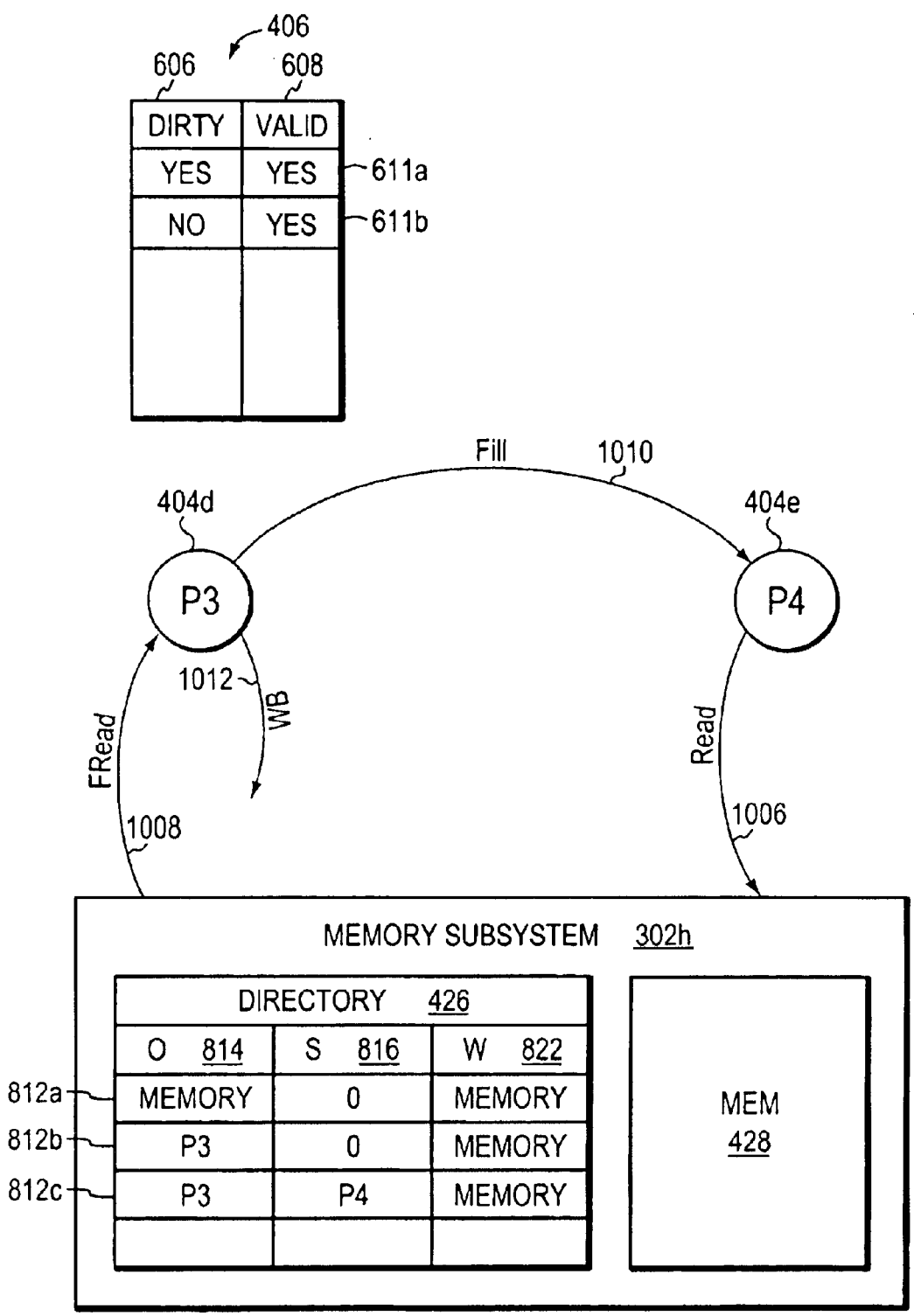
Figure 10C:
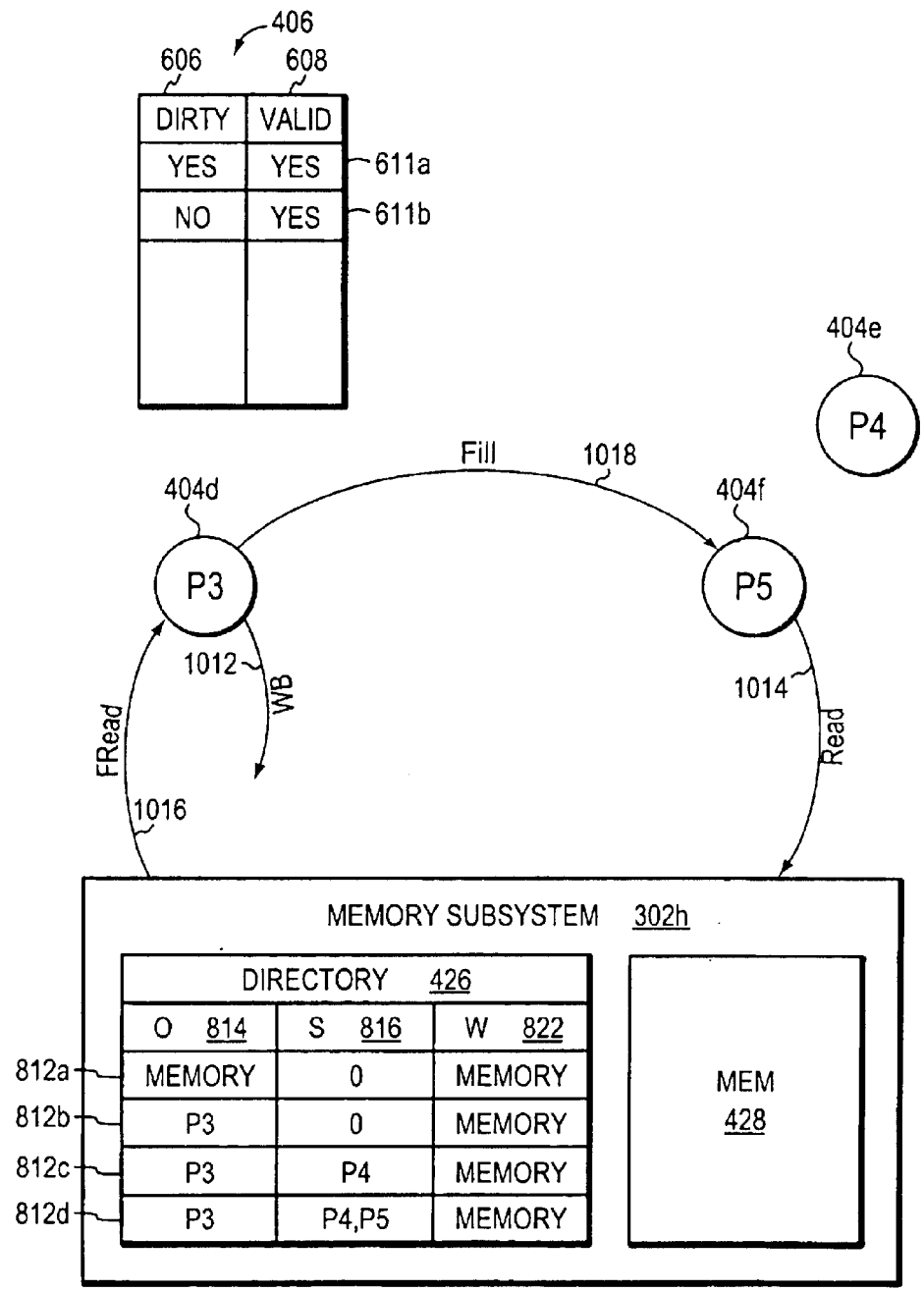
Figure 10D:
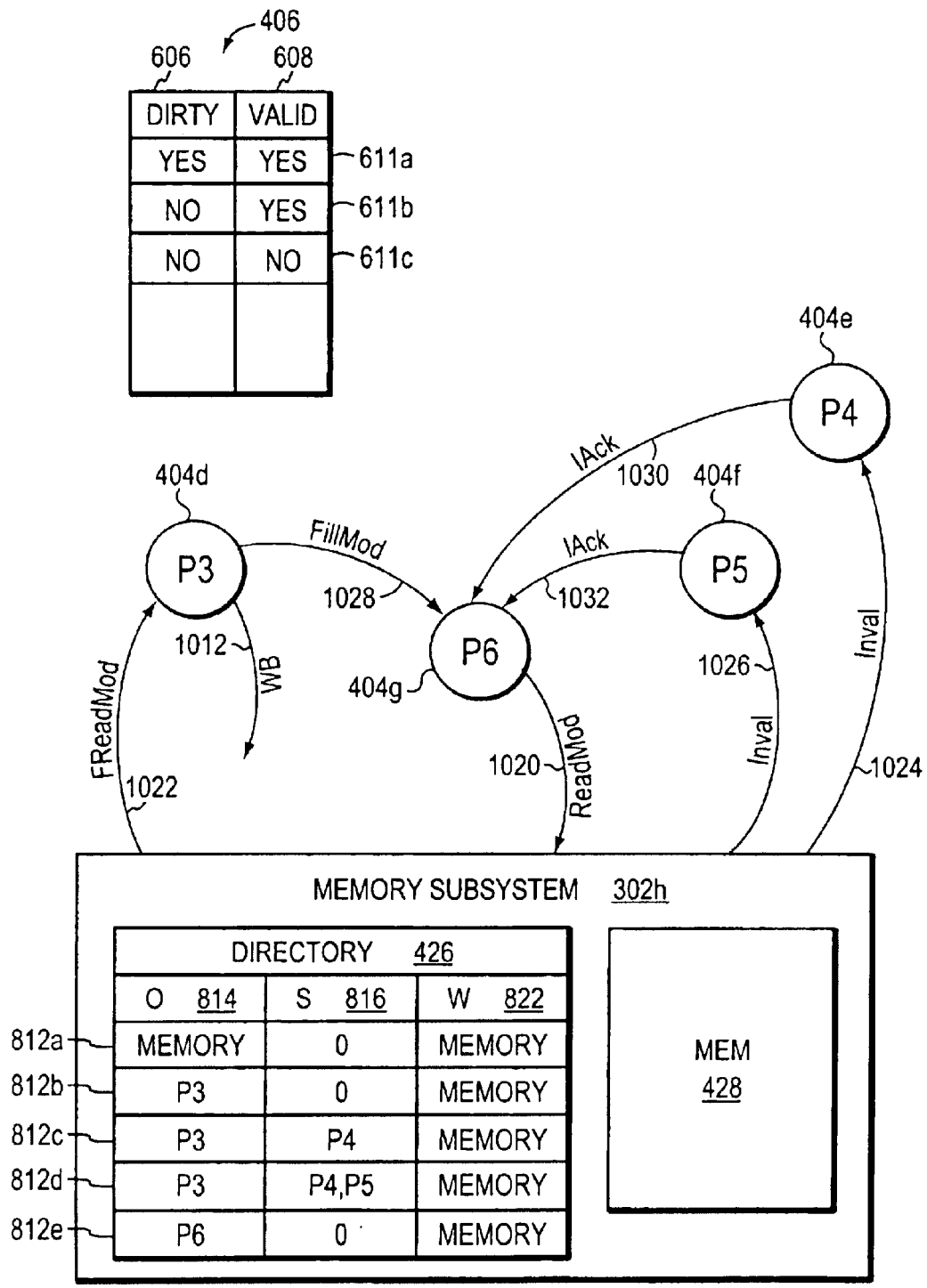

As P3 is configured to operate in non dirty-shared mode, it preferably maintains only two flags for each memory block stored in its cache: a valid flag, and a dirty flag. Upon receipt of the FillMod command 1004, P3 fills its cache with the received memory block and updates the respective entry of its cache tags storage device 406, which is shown in part in FIG. 10A. Specifically, P3 asserts, e.g., sets to Yes, both the dirty and valid flags 606, 608 (FIG. 10A). Cache tags storage device entry 611a (FIG. 10A) illustrates how the entry would appear upon P3's receipt of the FillMod command 1004. Before writing, e.g., modifying, the block, P3 confirms that both the valid and dirty flags 606, 608 are asserted, thereby indicating that the block is valid and that P3 has write access over the block.

As before, suppose another processor, e.g., processor P4 also designated by reference numeral 404e (FIG. 10B), issues a memory reference operation, such as Read command 1006 on the Q0 virtual channel, requesting read access to the same memory block to which processor P3 obtained write access. The Read command 1006 from P4 is also routed to memory subsystem 302h, and the memory controller 424 accesses the directory entry, i.e., entry 812b. Directory entry 812b indicates processor P3 as the current owner and memory as the last writer. Accordingly, the memory controller 424 concludes that processor P3, whose PID is stored in the owner/sharer field 814, is the current owner of the memory block.

The memory subsystem 302h responds by issuing a FRead command 1008 on the Q1 virtual channel to processor P3. The FRead command 1008 instructs P3 to service P4's read request out of P3's cache, which memory subsystem 302h considers to contain the most up-to-date version of the memory block. As part of its processing of the Read command 1006, memory subsystem 302h also updates the directory 426 to reflect that P4 is now a sharer of the memory block by entering P4's PID into sharer list field 816. Directory 812c (FIG. 10B) illustrates how entry 812b would appear following the home memory subsystem's processing of the Read command 1006.

When P3 receives the FRead command 1008, it searches its cache tags storage device 406 based on the memory address carried by the command 1008. The search results in a hit on P3's cache and the cache tag entry 611a indicates that the entry is dirty as well as valid. As P3 is configured in non dirty-shared mode, it is not permitted to share copies of memory blocks over which it has write access with other data processing entities of the system, such as other processors. Accordingly, P3 responds to the FRead command 1008 preferably by issuing a Fill command 1010 on the Q2 virtual channel to P4 carrying a copy of the memory block from P3's cache, and by returning the memory block to the home memory subsystem 302h in a Write_Back (WB) command 1012. P3 also updates its cache tag entry 611a. Depending on its particular configuration, P3 may be permitted to retain a valid copy of the memory block even though it has written the block back to memory. In this case, P3 de-asserts, e.g., sets to No, the dirty flag 606, but leaves the valid flag 608 asserted, as indicated by cache tag entry 611b. Accordingly, P3 can continue to read and use the memory block in its processing, but cannot write to the block.

Alternatively, P3 may be configured to invalidate a dirty memory block state upon receipt of a snoop read, i.e., FRead command 1008. In this case, P3 would de-assert the valid flag 608 as well.

Suppose further that before the WB command 1012 is received at and/or processed by the home memory subsystem 302h another entity, e.g. processor P5 also designated by reference numeral 404f (FIG. 10C), issues a Read command 1014 on the Q0 virtual channel requesting read access for this memory block. P5's Read command 1014 is similarly routed to memory subsystem 302h, which retrieves the corresponding directory entry, i.e., entry 812c. As the WB command 1012 has yet to be received at and/or processed by memory subsystem 302h, the writer field 822 still specifies memory while the owner field 814 still specifies P3. The memory controller 424 thus concludes that P3 is still the current owner of the memory block.

Accordingly, memory subsystem 302h issues a FRead command 1016 on the Q1 virtual channel to processor P3. Memory subsystem 302h also updates the directory 426 to reflect that P5 is another sharer of the memory block by adding P5's PID into sharer list field 816. Directory entry 812d (FIG. 10C) illustrates how entry 812c would appear following the home memory subsystem's processing of P5's Read command 1014.

When P3 receives the FRead command 1016, it searches its cache tags storage device 406. Assuming P3 kept the memory block in the valid state, the FRead command 1016 results in a hit on P3's cache. As the identified memory block is no longer dirty, P3 in accordance with the present invention responds by issuing a Fill command 1018 on the Q2 virtual channel to P5 carrying a copy of the memory block from P3's cache. P3 does not issue another WB command nor does it make any additional changes to its cache tag entry 611*b*. Nonetheless, as the valid flag 608 remains asserted, P3 can continue to read and use the memory block in its processing, but cannot write to the block.

Suppose yet another processor P6 also designated by reference numeral 404*g* (FIG. 10D) issues a ReadMod command 1020 requesting write access to the memory block, that arrives at the home memory subsystem 302*h* before the WB command 1012 is received and/or processed. As the WB command 1012 has yet to be received and/or is processed, the corresponding directory entry 812*d* continues to show P3 as the owner, P4 and P5 as sharers, and memory as the last writer. The memory controller thus responds to P6's ReadMod command 1020 by issuing an FRead Mod command 1022 on the Q1 virtual channel to P3 and Inval commands 1024, 1026 to P4 and P5, respectively. The home memory subsystem also updates directory entry 812*d* by inserting P6's PID in the owner field 814 (replacing P3) and setting to null the sharer field 816. Directory entry 812*e* indicates how entry 812*d* would appear following the home memory subsystem's processing of the ReadMod command 1020 from P6.

When P3 receives the FReadMod command 1022, it searches its cache tags storage device 406 based on the memory address carried by the command 1022. The search results in a hit on P3's cache as the valid flag 608 of the corresponding cache tag entry is still asserted. Accordingly, P3 responds by issuing a FillMod command 1028 on the Q2 virtual channel to P6 carrying a copy of the memory block from P3's cache. P3 also updates its cache tag entry 611*b* for the memory block. In particular, P3 de-asserts the valid flag 608 because only a single data processing entity is permitted to have write access to a given memory block at any time. Cache tag entry 611*c* indicates how entry 611*b* would appear following P3's processing of the FReadMod command 1022.

Both P4 and P5 respond to the Inval commands 1024, 1026 by invalidating their copies of the memory block. They also issue IAck commands 1030, 1032 to P6 indicating that they have indeed invalidated their copies of the memory block.

Figure 10E:
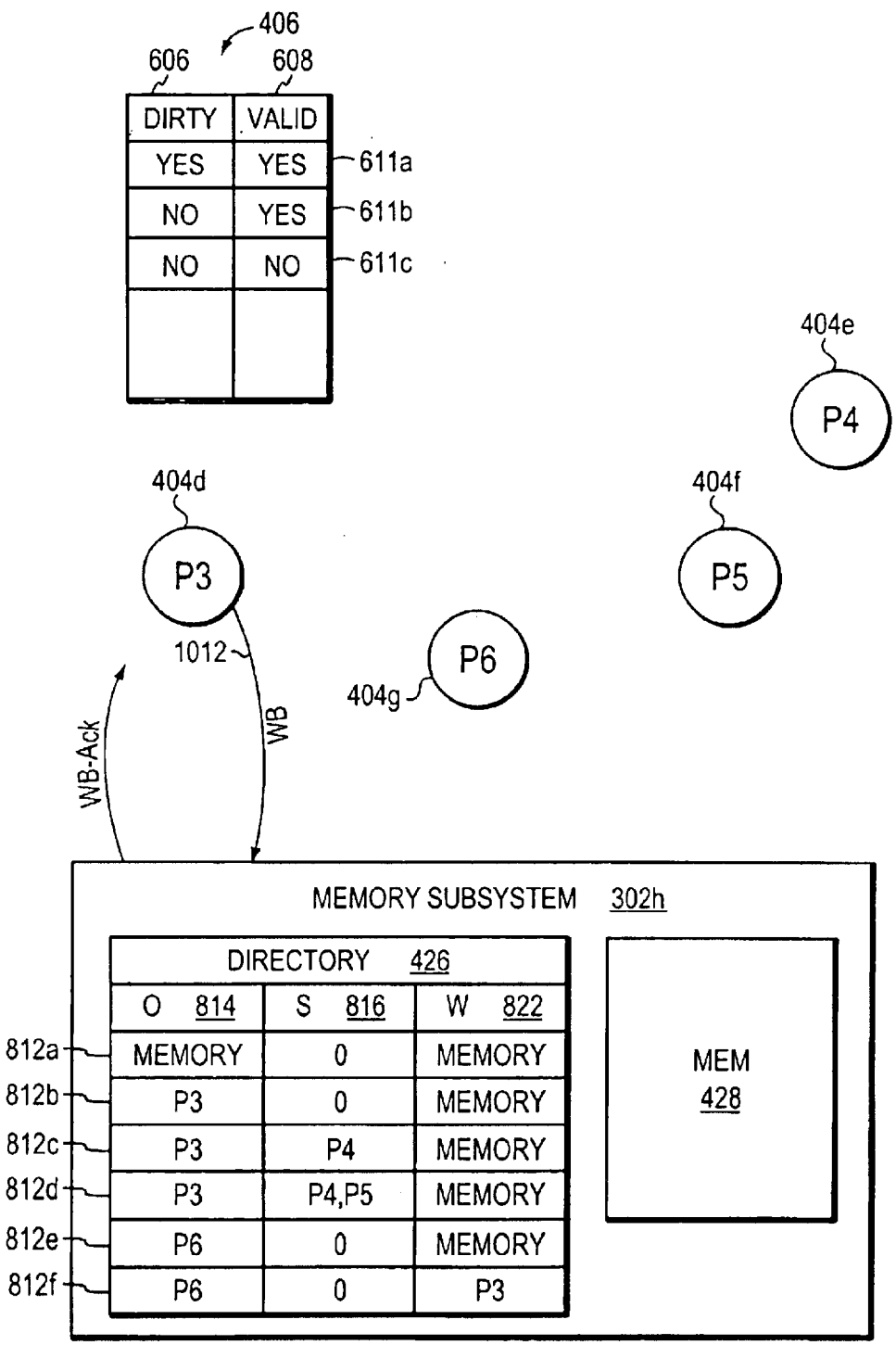

Referring to FIG. 10E, when the WB command 1012 is finally received at the home memory subsystem 302*h*, the modified data is written to the memory device 428 and the directory entry, i.e., entry 812*e* is accessed, so that the writer field 922 may be updated with the P3's PID. Directory entry 812*f* (FIG. 10E) illustrates how entry 812*e* would appear following the processing of the WB command 1012 at memory subsystem 302*h*. In particular, the writer field 822 is updated, but the owner and sharer fields 814 and 816 are left unchanged. In the preferred embodiment, the memory subsystem 302*h* also returns a WB_Ack command 1034 to P3 on the Q2 virtual channel upon completing its processing of the WB command 1012.

It should be understood that in either the dirty-shared or non dirty-shared cases, if a snoop read (requesting shared or exclusive access) is received after the owner has issued a WB command, then a late race condition will occur. Suitable mechanisms for resolving such late races are described in commonly owned, copending U.S. patent application Ser. No. 10/263,836 titled CHANNEL-BASED LATE RACE RESOLUTION MECHANISM FOR A COMPUTER SYSTEM, filed Oct. 3, 2002, and U.S. patent application Ser. No. 10/263,743 titled RETRY-BASED LATE RACE RESOLUTION MECHANISM FOR A COMPUTER SYSTEM, filed Oct. 3, 2002, both of which are hereby incorporated by reference in their entirety.

As shown, the low occupancy cache coherency protocol of the present invention allows system designers to include both dirty-shared and non dirty-shared data processing entities in a single computer system. The dirty-shared and non dirty-shared data processing entities, moreover, can be interspersed throughout the computer system at the discretion of the system designer. That is, they do not need to be segregated into separate partitions each containing only one type of data processing entities. Furthermore, the computer system executes a single cache coherency protocol that works just as well with dirty-shared and non dirty-shared processing elements. The present invention thus affords system designers a level of flexibility in the selection of data processing elements that was heretofore not possible.

The foregoing description has been directed to specific embodiments of the present invention. It will be apparent, however, that other variations and modifications may be made to the described embodiments, with the attainment of some or all of their advantages. For example, the SMP system could employ a plurality of physically independent channels, each having its own components, such as individual buffers, logic and communication paths, instead of virtual channels that share such components. Therefore, it is the object of the appended claims to cover all such variations and modifications as come within the true spirit and scope of the invention.

What is claimed is:

1. A computer system comprising:
   a plurality of processors; and
   a main memory coupled to the plurality of processors by an interconnect fabric, the main memory organized to store data in terms of memory blocks at least one or more of which are shared by the plurality of processors, wherein,
   the processors store memory blocks to which they have write access in a dirty state,
   at least one processor operates in a dirty-shared mode such that the at least one dirty-shared processor is configured to share memory blocks that the dirty-shared processor holds in the dirty state with one or more other processors, and
   at least one processor operates in a non dirty-shared mode such that the at least one non dirty-shared processor is precluded from sharing memory blocks that the non dirty-shared processor holds in the dirty state with one or more other processors.

2. The computer system of claim 1 wherein the at least one non dirty-shared processor responds to a first snoop read targeting a dirty memory block by writing the dirty memory block back to the main memory.

3. The computer system of claim 2 wherein
   the first snoop read is initiated by a first source processor, and
   the at least one non dirty-shared processor further responds to the first snoop read by sending a copy of the dirty memory block to the first source processor.

4. The computer system of claim 3 wherein the at least one non dirty-shared processor responds to a second snoop read initiated by a second source processor by sending a copy of the dirty memory block to the second source processor, provided that the dirty memory block remains valid.

5. The computer system of claim 4 wherein the second snoop read is issued by the main memory before the dirty memory block is written back thereto.

6. The computer system of claim 2 wherein the at least one dirty-shared processor responds to a second snoop read initiated by a source processor targeting a dirty memory block by sending a copy of the dirty memory block to the source processor without writing the dirty memory block back to the main memory.

7. The computer system of claim 1 further comprising one or more directories for use in maintaining coherence of the memory blocks, the one or more directories having an entry for each memory block, each directory entry including an owner field for specifying an owner of the memory block, and a writer field for specifying the last processor to have written the memory block back to the main memory.

8. The computer system of claim 7 wherein each directory entry further includes a sharer list field for specifying which processors have a shared copy of the respective memory block.

9. The computer system of claim 7 wherein the processors and the main memory cooperate in the execution of a single cache coherency protocol.

10. The computer system of claim 7 wherein the main memory is formed from a plurality of memory subsystems, and the directory is distributed across the plurality of memory subsystems.

11. The computer system of claim 7 wherein the directory is free from maintaining one or more transient states for the memory blocks.

12. A method for use by a computer system having a plurality of processors and a main memory configured to store data in terms of memory blocks accessible by the plurality of processors through an interconnect fabric, the method comprising the steps of:

storing a memory block at a processor that has write access to the memory block in a dirty state;

responding to a snoop read received at a first processor that targets a dirty memory block by writing the dirty memory block from the first processor back to the main memory; and responding to a snoop read initiated by a source processor and received at a second processor that targets a dirty memory block by sending a copy of the dirty memory block from the second processor to the source processor without writing the dirty memory block back to the main memory.

13. The method of claim 12 wherein the snoop read received at the first processor is initiated by a second source processor, the method further comprising the step of further responding to the snoop read received at the first processor by sending a copy of the dirty memory block from the first processor to the second source processor.

14. The method of claim 12 further comprising the step of providing at least one directory for use in maintaining coherence of the memory blocks configured at the main memory, the directory having, for each memory block, an owner field specifying the owner of the respective memory block, a sharer list specifying the processors that have a shared copy of the respective memory block, and a writer field specifying the last processor to have written the respective memory block back to the main memory.

* * * * *